April 21, 1959 J. L. BARKER 2,883,644

TRAFFIC ACTUATED CONTROL SYSTEM

Filed Nov. 18, 1957 5 Sheets-Sheet 1

INVENTOR.
JOHN L. BARKER
BY Edward H. Eames
ATTORNEY

April 21, 1959 J. L. BARKER 2,883,644

TRAFFIC ACTUATED CONTROL SYSTEM

Filed Nov. 18, 1957 5 Sheets-Sheet 2

INVENTOR.
JOHN L. BARKER
BY Edward G. Evans
ATTORNEY

April 21, 1959 J. L. BARKER 2,883,644

TRAFFIC ACTUATED CONTROL SYSTEM

Filed Nov. 18, 1957 5 Sheets-Sheet 3

INVENTOR.
JOHN L. BARKER

BY Edward W. Evans
ATTORNEY

April 21, 1959 J. L. BARKER 2,883,644

TRAFFIC ACTUATED CONTROL SYSTEM

Filed Nov. 18, 1957 5 Sheets-Sheet 4

INVENTOR.
JOHN L. BARKER

BY Edward H. Evans

ATTORNEY

| PERIODS → | PHASE B | | PHASE A MINOR | | PHASE A MAJOR | | PHASE B | | PHASE A MAJOR | |
|---|---|---|---|---|---|---|---|---|---|---|
| | 11p | 12p | 13p | 14p | 15p | 16p | 17p | 18p | 19p | 20p |
| PHASE A MAJOR NORTH | R | R | R | R | G | Y | R | R | G | Y |
| PHASE A MAJOR SOUTH | R | R | R | R | G | Y | R | R | G | Y |
| PHASE B | G | Y | R | R | R | R | G | Y | R | R |
| PHASE A MINOR NORTH | R | R | G | Y | R | R | R | R | R | R |
| PHASE A MINOR SOUTH | R | R | G | Y | R | R | R | R | R | R |

Fig. 5

| PERIODS → | PHASE B | | PHASE A MINOR | | PHASE A MAJOR | |
|---|---|---|---|---|---|---|
| | 21p | 22p | 23p | 24p | 25p | 26p |
| PHASE A MAJOR NORTH | R | R | G | G | G | Y |
| PHASE A MAJOR SOUTH | R | R | R | R | G | Y |
| PHASE B | G | Y | R | R | R | R |
| PHASE A MINOR NORTH | R | R | G | Y | R | R |
| PHASE A MINOR SOUTH | R | R | R | R | R | R |

Fig. 6

| PERIODS → | PHASE B | | PHASE A MINOR | | | | PHASE A MAJOR | |
|---|---|---|---|---|---|---|---|---|
| | 31p | 32p | 33pa | 33pb | 33pc | 34p | 35p | 36p |
| PHASE A MAJOR NORTH | R | R | R | R | G | G | G | Y |
| PHASE A MAJOR SOUTH | R | R | R | R | R | R | G | Y |
| PHASE B | G | Y | R | R | R | R | R | R |
| PHASE A MINOR NORTH | R | R | G | G | G | Y | R | R |
| PHASE A MINOR SOUTH | R | R | G | Y | R | R | R | R |

Fig. 7

INVENTOR.
JOHN L. BARKER
BY Edward H. Evans
ATTORNEY

United States Patent Office 2,883,644 Patented Apr. 21, 1959

2,883,644

TRAFFIC ACTUATED CONTROL SYSTEM

John L. Barker, Norwalk, Conn., assignor to Eastern Industries, Incorporated, East Norwalk, Conn., a corporation of Delaware Application November 18, 1957, Serial No. 697,037

13 Claims. (Cl. 340—36)

This invention relates to an improved and novel traffic control system for the control of opposing traffic at an intersection of two or more roads or thoroughfares and in particular for individual control of certain movements of traffic, on a highly flexible basis, through traffic actuation.

It is well known in the field of traffic control that the total traffic flow from one approach into an intersection, for example, may be broken up into movements of traffic and individually controlled in part by the addition of extra signal lights to control such movements of traffic, be it vehicular or pedestrian. However, it is here proposed to provide a novel system of control of individual groups of such movements of traffic by actuation by the traffic movement itself so that such control will accord right of way to certain such movements upon demand of such traffic individually or concurrently and when there is no demand for exclusive such right of way, to yield right of way in part to other traffic movement not interferring therewith.

It is already known to provide a traffic controller to control a minor traffic movement through actuation by such traffic, the minor movement controller being dependent upon a primary or parent controller controlling major traffic movements at a traffic intersection. Such a minor movement controller is disclosed by Charles L. Du Vivier in a copending application. Serial Number 697,036, filed on even date herewith and entitled Traffic Actuated Control Apparatus, and assigned to Eastern Industries, Incorporated, a Delaware corporation, the assignee of the present application.

In said copending application Charles L. Du Vivier discloses a traffic actuated controller for a minor traffic movement, which controller upon actuated demand of the minor traffic, inserts into the primary traffic control cycle, a subordinate phase of minor traffic movement, such minor phase being inserted into the cycle of a primary or parent controller at a pre-determined part of the cycle. In Mr. Du Vivier's disclosure he teaches the use of his minor movement controller to control left turn traffic movements into an intersection from one or more of the intersecting streets, where one minor movement controller is associated with one phase of the primary or parent controller and in effect splits one phase into two parts, a minor part of the phase for the left turn or turns and a major part of the phase for the opposing straight through traffic on the same street, along with right turn traffic. The said copending application also teaches how one minor movement controller may be associated with each phase of the parent controller.

The present invention provides an improved system of traffic control incorporating a new use of two of such minor movement controllers with a primary or parent controller by further subdividing one phase of the parent controller so that individual sets of interfering traffic movements are individually controlled, each set of interfering movements by one minor movement controller, the two minor movement controllers being associated with the same one phase of the primary or parent controller cycle for independent actuated control of two or more movements of traffic, as an insert or supplement to but permitting in part in such cycle of the overlapping the parent controller.

For convenience of reference in this disclosure, the term "phase" is generally employed to refer to a part of the traffic signal cycle serving a particular traffic movement or combination of movements with a right of way period, followed by a clearance period, the term sometimes being applied to the corresponding part of the cycle of the traffic signal controller, or to identify the signals associated wtih such traffic movement or movements controlled together, for example. The term "traffic phase" is sometimes used for convenience to mark the traffic movements on one phase of the signal cycle. Also, in some instances, it will be assumed that a traffic phase may be divided into subphases for individual or groups of movements, so that, for example, the left turn movement from the north approach, the left turn movement from the south approach, the through traffic movement (and right turn) from the north approach, the through traffic movement (and right turn) from the south approach, into an intersection may be referred to in some instances as phases or as sub-phases of a main traffic phase A.

In accordance with a preferred aspect of the invention, it is here proposed to control one movement of traffic, for example a left turn movement from a south approach into an intersection in relation to the opposing straight through movement on the north approach by the use of one minor movement controller, and to control a second movement of traffic, for example a left turn movement from the north approach into the intersection in relation to the opposing straight through movement from the south approach by the use of an additional minor movement controller, each left turn movement, for example, to be controlled independently of the other, each controlled by traffic actuation of the respective traffic movement and stopping interfering movements while allowing non-interfering traffic movements to proceed.

This novel method and means of control of a particular traffic movement via traffic actuation of the controlled traffic and the granting of right of way for non-interfering traffic during the right of way period for the particular traffic movement offers a great degree of flexibility of traffic flow through an intersection so controlled, while also greatly increasing safety by eliminating more conflicts between interfering traffic movements particularly between left turns and opposing straight through movements, for example.

It is therefore an object of the present invention to provide a traffic control system controlling two minor or subordinate traffic movements on one particular phase of a traffic signal control cycle by the use of an equal number of minor movement traffic controllers thereby according right of way to each such traffic movement independently of the other concurrently or individually and in a particular part of the cycle of the parent controller.

It is another object to grant right of way to non-interfering traffic movement or movements while right of way is accorded to such subordinate or minor traffic movement.

It is a further object to individually control two or more subordinate or minor traffic movements associated with a phase of traffic so that each subordinate traffic movement is independent of the other subordinate traffic movement.

Still another object is to present a system of traffic control whereby certain interfering traffic is controlled, on traffic demand, at a predetermined period in a cycle, by minor movement traffic controllers individually or collectively, the control of some of such interfering traffic and other traffic being returned to the parent controller at the termination of such control by the minor movement traffic controller or controllers.

With these and other objects in mind, that will appear herein, the present traffic control system will be described with reference to its preferred application, for example to the individual control of diagonally opposite left turn vehicle traffic movements in relation to other traffic movements at an intersection formed by two intersecting roads or thoroughfares. It will be appreciated however that the use of the present traffic control system need not be limited to such control of dual left turn traffic movements, as will herein be described, but it is within the scope of this traffic control system to control other individual mutually non-interfering traffic movements in relation to other interfering or partially interfering traffic movements, with some rearrangement of the components of the system as to location and effect and the like to meet other particular traffic situations of this general character or similar character at this or other type of intersections.

The present traffic control system utilizes a primary or parent controller, of a full or semi-actuated type hereinafter referred to as a parent controller, and a minor movement controller for each of the traffic movements to be controlled, appropriately connected electrically to the parent controller, as hereinafter described, with some type of detectors to detect the presence of traffic, and traffic signal lights of the conventional type to indicate right of way for the several traffic movements at the intersection.

For convenience of illustration a two phase, full actuated traffic controller, of the type hereinafter described, shall serve as the parent controller, although any of the well known full actuated or semi-actuated traffic controllers may be used as a parent controller. A non-actuated or pretimed controller may also serve as a parent controller. Two minor movement controllers of the type hereinafter described shall be used to control the desired traffic movements, such as two opposite left turn movements from the same street. The individual minor movement controller may be of substantially the type disclosed in said copending application of Charles Du Vivier as illustrated in Fig. 4 hereof and described herein in connection with Fig. 4, with the addition in the present case of a relay YC where a certain "yield control" feature is desired as described below.

The detectors may be of any well known type, either pressure sensitive or sound sensitive, mechanical, electrical or electronic, but for convenience herein the detectors will be assumed to be the type of vehicle detector which closes an electrical contact responsive to pressure of a vehicle passing over the same.

Traffic signals of the conventional colors, green for go, red for stop and yellow for caution or clearance will be used in the description below.

The basic cycle of the parent controller includes two primary phases, phase A and phase B. Phase A shall be assumed to comprise of two parts, phase A major and phase A minor. Phase A minor will be assumed to be that part of the phase A where the right of way is given to the individual traffic left turn movements here controlled, whether both such traffic movements controlled are given the right of way concurrently or only one such traffic movement is given the right of way at the time.

Further distinction shall be made of the phase A major traffic movement in that the phase A major traffic movement approaching from the north shall be referred to as phase A major north. Such phase A major traffic approaching from the south shall be referred to as phase A major south. The phase A minor traffic movement approaching from the north shall herein be referred to as phase A minor north and the phase A minor traffic movement approaching for the south shall be referred to as phase A minor south.

Figure 3:
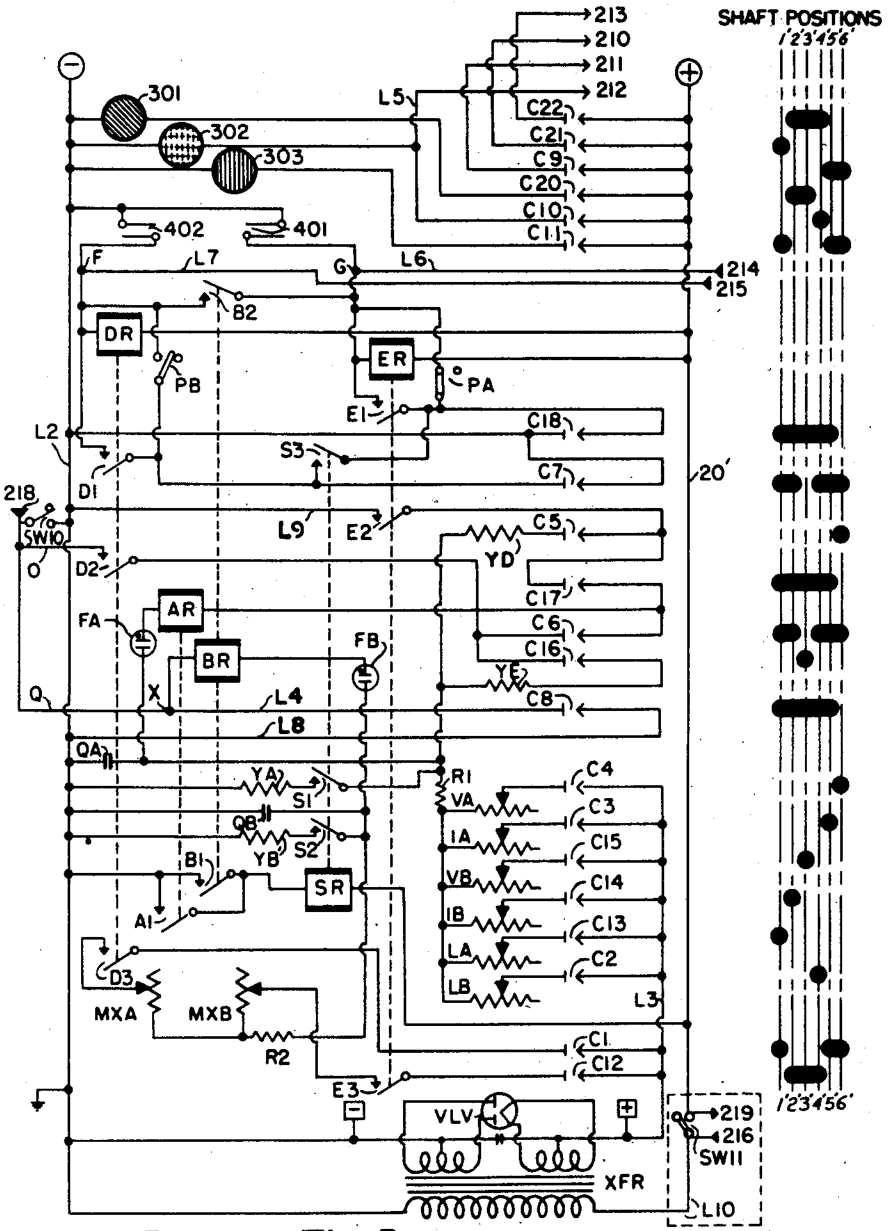
Fig. 3 is a diagram in schematic form of one type of parent controller, that may be used in the present traffic control system, with a chart at the right.
Figure 3A:
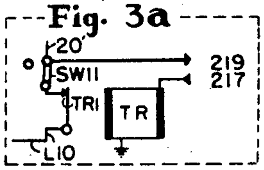

Fig. 3*a* is a diagram in schematic form of an alternate method of timing control of the parent controller timing circuit by the minor movement controller, as a modification of Fig. 3.

Figure 4:
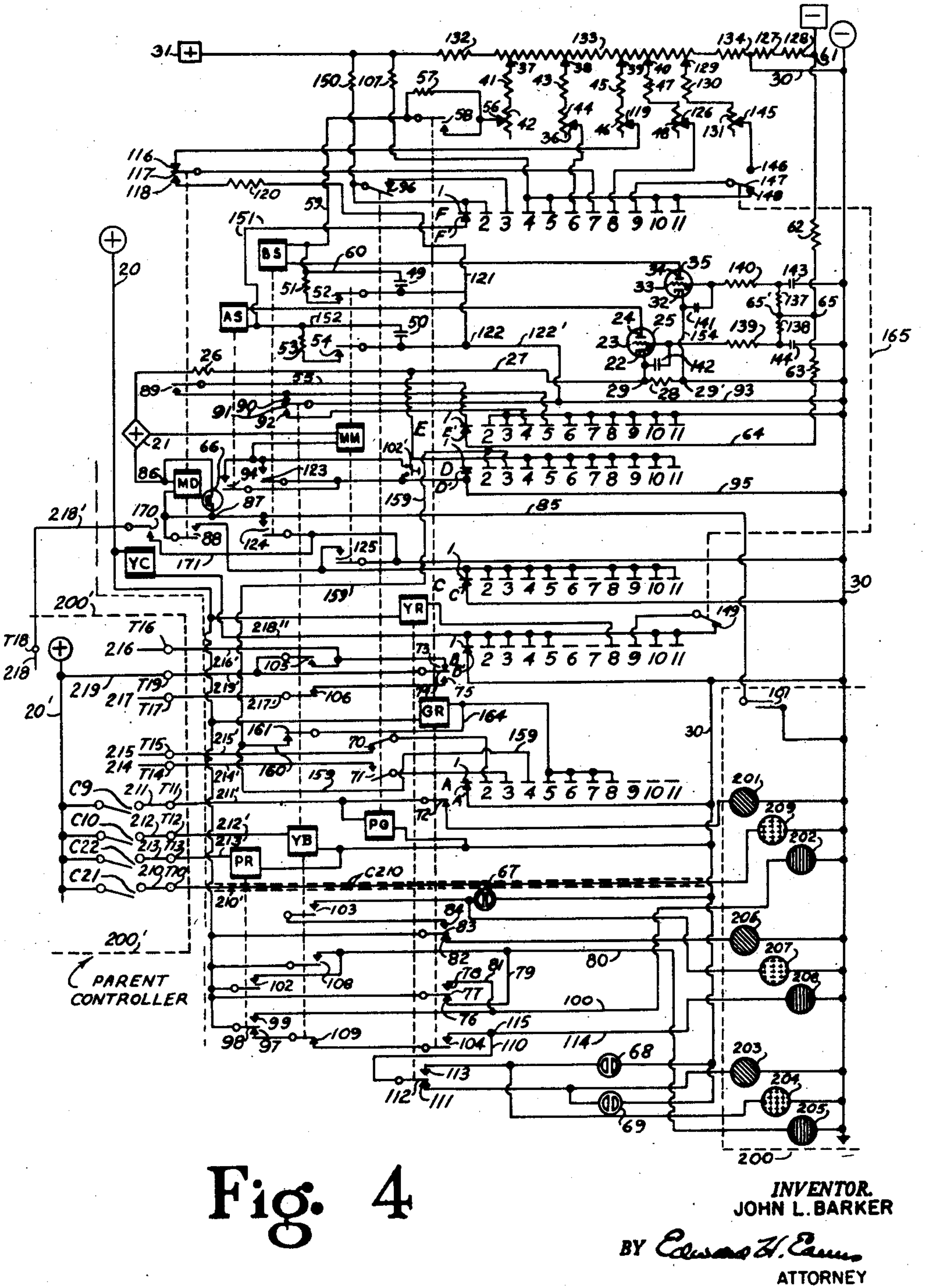

Fig. 4 is a diagram in schematic form of a minor movement controller with a parent controller, separated from the minor movement controller by a broken line 200′, illustrated in part in the lower left part of the diagram, showing the electrical connections between the parent controller and the minor movement controller, and external elements such as signal lights and a detector illustrated in the lower right separated from the minor movement controller by a broken line 200.

Fig. 5 is a phase sequence chart illustrating two cycles of the parent controller with a minor phase of two controlled traffic movements inserted into one of the phases of one cycle.

Fig. 6 is a phase sequence chart illustrating one cycle of the parent controller with a minor phase of one of two such controlled traffic movements inserted into one phase of the cycle.

Fig. 7 is a phase sequence chart illustrating one cycle of the present controller, illustrating the possible signal sequence of two minor phases when one minor phase terminates earlier than the other.

Figure 8:
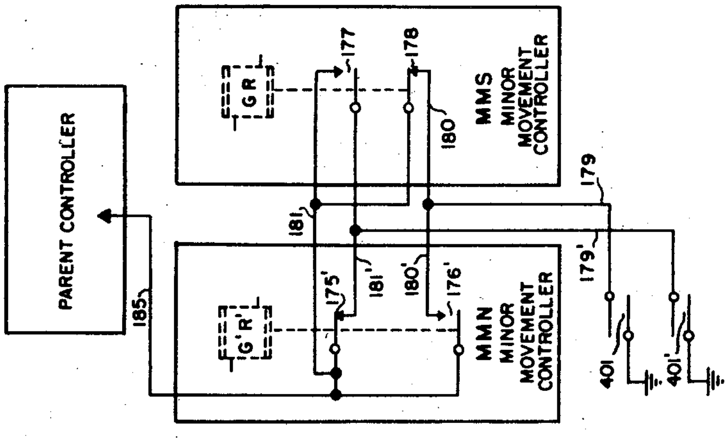

Fig. 8 is a diagram, partly in block form and partly in schematic form illustrating a parent controller and two minor movement controllers in block form and a detector control circuit with two detectors, in schematic form.

Consideration will now be given to the general operation of the traffic control system herein. It is believed that such general description of the operation which is to follow will provide an introduction for the detailed descriptions of the several figures that follow.

Figure 1:
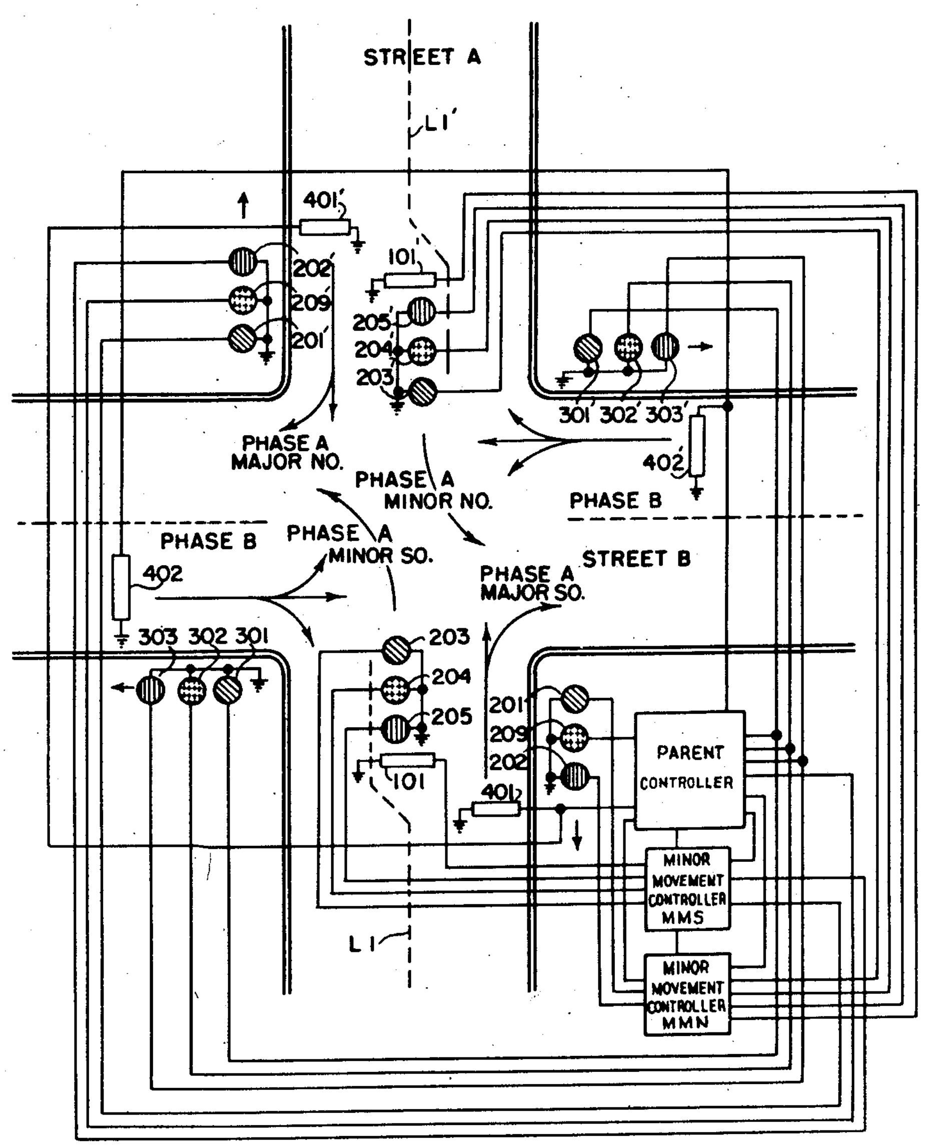
Fig. 1 is a diagram of a controlled intersection formed by two intersecting thoroughfares or streets illustrating signal lights of the conventional type, a parent controller and two minor movement controllers associated with the parent controller, with associated traffic detectors.

In the description below two minor movement controllers (one such minor movement controller being disclosed in Fig. 4), are employed with one parent controller. Both minor movement controllers are associated with the same phase of the parent controller as illustrated in Fig. 1, one minor movement controller is employed to control one left turn traffic movement, for example a left turn traffic movement from the south approach of Street A, while the other minor movement controller is employed to control the opposite left turn traffic movement from the north approach, for example, of Street A.

When both minor movement controllers, MMS and MMN, for example, are actuated so that each inserts its minor phase into the cycle of the parent controller, both minor phases will begin at the same point in the cycle of the parent controller, and at the same time.

Each minor movement controller will control the left turn traffic movement with which it is associated and the diagonally opposite through and right turn traffic movements on the same street.

Since both minor movement controllers are identical and both have an extendible vehicle interval timer and maximum interval timer associated with the same position of the rotary stepping switch, as will be later fully described, each may terminate its respective minor phase independently at the same time or at different times although both minor phases will be initiated individually at the same time, dependent on traffic conditions in the left turn lanes.

Since each minor movement controller is independent of the other, one minor movement controller may be actuated to proceed through its cycle of operation for its associated minor traffic movement, while the other minor movement controller may remain at rest due to absence of actuation by its respective traffic movement.

Should this situation occur, the actuated minor movement controller would accord right of way to the left turn traffic movement which it controls and cause interruption of right of way to be maintained for the diagonally opposite through and right turn traffic movements in the potential right of way position for phase A major of the parent controller. On the other hand the inactive minor movement controller would maintain interruption of right of way for the left turn traffic movement which it controls and would allow right of way to be accorded to the diagonally opposite through and right turn traffic movements in such potential right of way position of the parent controller.

Fig. 1 herein represents an intersection of two streets, Street A and Street B for example, that is controlled by a traffic controller, illustrated by a rectangle in the lower right quarter of the diagram and marked "parent controller." The curb lines of the intersection are illustrated by double lines. For the purpose of this illustration it shall be assumed that Street A serves north and south traffic and Street B serves east and west traffic. Street A differs somewhat from Street B in that Street A has a lane, marked by lines L1 and L1', at each approach to the intersection, specifically set apart for vehicles making a left turn from Street A.

It shall be noted that associated with the parent controller and located below the rectangle so marked are two rectangles marked "Minor Movement Controller MMS" and "Minor Movement Controller MMN." The minor movement controllers are connected electrically to the parent controller. These connections are illustrated in more detail in Fig. 4 which is explained more fully below.

The parent controller directly controls the signals 301, 302 and 303, green, yellow and red respectively, for vehicle traffic approaching the intersection from the west and the signals 301', 302' and 303', green, yellow and red respectively, for vehicle traffic approaching the intersection from the east along the Street B, as indicated by the small arrows adjacent the signals. The larger arrows adjacent the legend "Phase B" indicate the traffic movement from each approach to the intersection that vehicle traffic may take during "Phase B," which is when, in the cycle of operation of the parent controller, a green signal is illuminated to vehicle traffic on Street B indicating a right of way for such traffic and followed by a yellow signal for clearance of such traffic. Such traffic movements into the intersection from Street B may proceed straight through the intersection or make a right turn or left turn.

The rectangles 402 and 402' represent vehicle detectors that are placed in the street, for example, to be actuated by vehicle traffic approaching the intersection along Street B, over the respective vehicle detector, so that a "call" is sent to the parent controller to which the detectors 402 and 402' are connected, for subsequent accord of right of way thereto.

The signals 201, 209 and 202, green, yellow and red respectively, control vehicle traffic approaching the intersection from the south along Street A except left turn traffic approaching from the south while the signals 201', 209' and 202', green, yellow and red respectively, control vehicle traffic approaching the intersection from the north along Street A except left turn traffic approaching from the north. The signals 209 and 209' are controlled directly by the parent controller while the signals 201 and 202 are controlled by the minor movement controller MMN and the signals 201' and 202' are controlled by the minor movement controller MMS.

The arrow marked "Phase A Major So." indicates the traffic movements of vehicle traffic approaching the intersection from the south during "phase A major south" which is when, in the cycle of operation of the parent controller, in cooperation with the minor movement controller MMN, a green signal is illuminated to vehicle traffic approaching from the south on Street A indicating a right of way for such traffic, and followed by a yellow signal for clearance. Such traffic movements may proceed, during such right of way period, into the intersection from the south and execute a right turn or proceed straight through the intersection.

The arrow marked "Phase A Major No." indicates the traffic movements of vehicle traffic approaching the intersection from the north during "phase A major north," which is when, in the cycle of operation of the parent controller, in cooperation with the minor movement controller MMS, a green signal is illuminated to vehicle traffic approaching from the north on Street A, indicating a right of way for such traffic, and followed by a yellow signal for clearance. Such traffic movements may proceed, during such right of way period, into the intersection from the north and execute a right turn or proceed straight through the intersection.

The left turn traffic movement approaching from the south and the left turn traffic movement approaching from the north are individually controlled by the signals 203, 204 and 205, green, yellow and red respectively, for south approach traffic and 203', 204', and 205', green, yellow and red respectively, for north approach traffic. The signals 203, 204 and 205 are controlled by the minor movement controller MMS while the signals 203', 204' and 205' are controlled by the minor movement controller MMN.

The arrow marked "Phase A Minor So." indicates the traffic movement during "phase A minor south," which is when, in the cycle of operation of the parent controller, in cooperation with the minor movement controller MMS, a green signal is illuminated to vehicle traffic approaching from the south in the left turn lane on Street A, indicating a right of way for such traffic, and followed by a yellow signal for clearance. Such traffic may proceed, during such right of way period and execute a left turn from the south approach.

The arrow marked "Phase A Minor No." indicates the traffic movement during "phase A minor north," which is when, in the cycle of operation of the parent controller, in cooperation with the minor movement controller MMN, a green signal is illuminated to vehicle traffic approaching from the north in the left turn lane on Street A, indicating a right of way for such traffic, and followed by a yellow signal for clearance. Such traffic may proceed, during such a right of way period and execute a left turn from the north approach.

The rectangles marked 401 and 401' represent vehicle detectors that are placed in Street A for actuation by vehicle traffic approaching along Street A, other than left turn traffic, in the south and north approaches respectively, so that a "call" is sent by such actuation, to the parent controller to which the detectors 401 and 401' are connected. For the purposes of the present description calls via 401 and 401' vehicle detectors are not distinguished at this time, however as fully described hereinafter there are some situations where such distinction will be necessary.

The rectangle marked 101 represents a vehicle detector placed in the left turn lane of the south approach of Street A. This detector is placed in the left turn lane so that the detector would be actuated by those vehicles whose drivers wish to execute a left turn from the particular lane, and so that through traffic and right turn traffic would not actuate this detector. When vehicle detector 101 is actuated a "call" is sent to the minor movement controller MMS to which the detector is connected.

Vehicle detector 101', represented by the rectangle so marked, is located in the north approach left turn lane of Street A for actuation only by left turning traffic and upon such actuation, sends a "call" to minor movement controller MMN.

Figure 2:
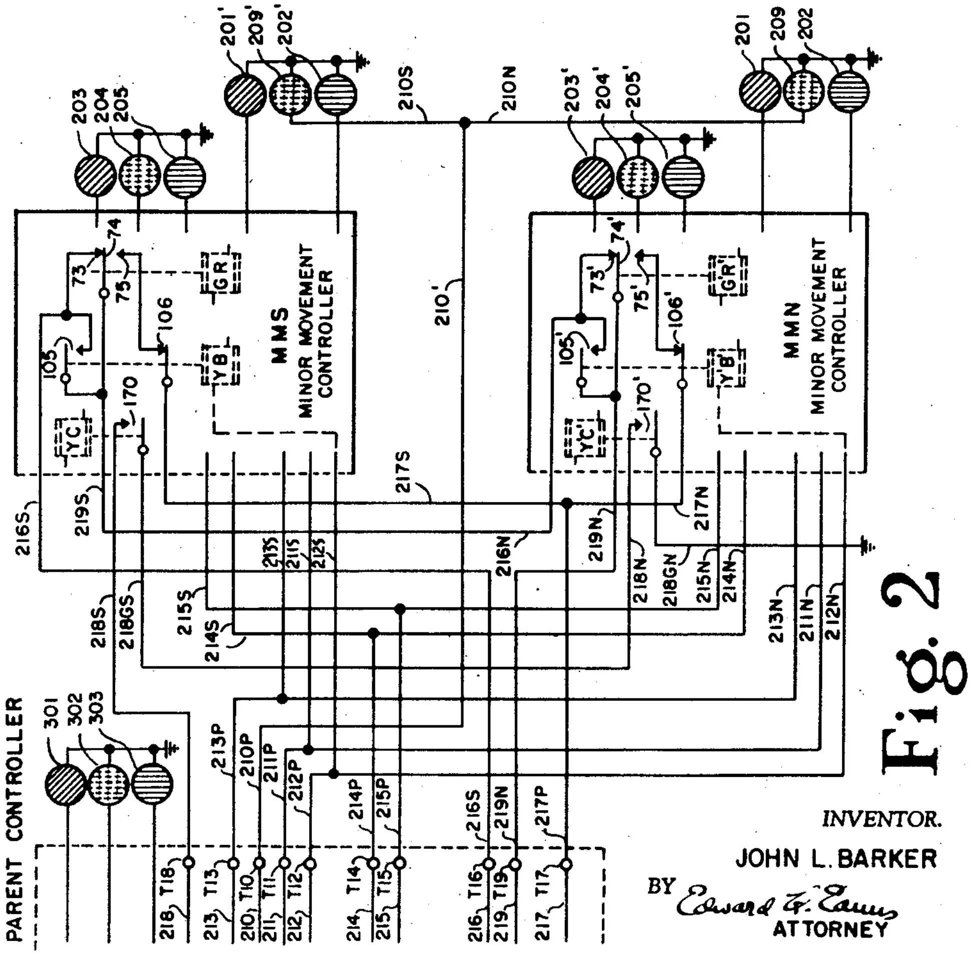
Fig. 2 is a diagram in block form, illustrating the interconnecting circuits between the parent controller, on the left, marked off by a broken line and two minor movement controllers, illustrated by two rectangles, with the signal lights appropriately controlled by each controller.

Fig. 2 herein is a diagram partly in block and partly in schematic form. The incomplete box in the left of the figure formed by broken lines represents a parent controller, the like of which has been described below with reference to Fig. 3. Extending from the parent controller are the interconnecting lines following to two minor movement controllers, MMS and MMN each here represented by a box formed by a broken line on the left of the box and three solid lines. Each of the minor movement controllers MMS and MMN is similar to that described herein with reference to Fig. 4 and marked similarly to those minor movement controllers represented in Fig. 1 above.

Extending from the parent controller are three signals 301, 302 and 303 which represent the phase B signals which appear in Fig. 1 and Fig. 3 with similar numbers. Only one set of phase B signals is represented here for convenience but it is understood that two such sets of signals, one set for the east approach and one set for the west approach on Street B would be controlled directly by the parent controller.

Within the box marked "Minor Movement Controller MMS," in phantom form are the relay YC, YB and GR. These relays correspond to similarly marked relays in the minor movement controller described above. The contacts 105 and 106 of relay YB, contact 170 of relay YC and contacts 73/74 and 74/75 of relay GR are comparable to contacts identically marked in Fig. 4 wherein they are described.

Within the box marked minor movement controller MMN, in phantom are the relay Y'C', Y'B' and G'R' with their associated contacts marked similarly to those described above except for the addition of a "prime" mark to each number. These relays and contacts are also similar to those described above but without a prime mark on the number.

Wherever it is practical similar component parts and similar lines in Fig. 2 have either identical or similar labels or numbers with corresponding parts and lines in Figs. 1, 3, 3*a* and 4, for convenience of reference.

The signal lights 203, 204, 205, 201' and 202' are illustrated as extending from the minor movement controller MMS to which they are electrically connected and by which they are controlled.

The signal lights 203', 204', 205', 201 and 202 are illustrated as extending from the minor movement controller MMN to which they are electrically connected and by which they are controlled.

The signal lights 209' and 209 are connected to the parent controller and are controlled by the parent controller directly.

When energized as previously described the line 210, in the parent controller, completes a circuit to illuminate the signal lights 209 and 209' from the parent controller through line 210, terminal T10, line 210', line 210S to signal 209' to ground and in shunt from line 210' to line 210N to signal 209 to ground.

Line 211, in the parent controller, is part of the energizing circuit for a relay PG in the minor movement controller shown in Fig. 4. When two such minor movement controllers are used, as here explained such energizing circuit is completed in parallel to each minor movement controller from the parent controller through line 211, terminal T11, lines 211P, 211S to the minor movement controller MMS and in shunt from line 211P, via line 211N to minor movement controller MMN.

Similarly line 212, of the parent controller, is part of a circuit to energize the relay YB in the minor movement controller as in Fig. 4, and shown in Fig. 2 in parallel to each minor movement controller from the line 212, through terminal T12, lines 212P, 212S to the minor movement controller MMS to relay YB and in shunt from line 212P through line 212N to minor movement controller MMN, to relay Y'B'.

Line 213, of the parent controller, is part of an energizing circuit for the relay PR shown in Fig. 4, in the minor movement controller and is here connected in parallel to each minor movement controller from line 213 through terminal T13, lines 213P, 213S to minor movement controller MMS and in shunt from line 213P through line 213N to minor movement controller MMN.

Line 214, of the parent controller, is part of the minor movement to parent "call" circuit, which places a call for phase A as later explained. The circuit is connected to each minor movement controller from the line 214 through terminal T14, lines 214P, 214S to the minor movement controller MMS, and in parallel from line 214P through lines 214N to the minor movement controller MMN.

Similarly line 215, of the parent controller is part of the minor movement to parent "call" circuit which places a call to phase B as later described. The circuit is connected in parallel to each minor movement controller from line 215 through terminal T15, lines 215P, 215S to minor movement controller MMS and in parallel from line 215P through line 215N to minor movement controller MMN.

The lines 216 and 219 are part of one of the timing control circuits as illustrated in Fig. 3. This circuit from line 219 of the parent controller is connected in a series circuit through each minor movement controller to the line 216 of the parent controller. The circuit extends from line 219, through terminal T19, line 219N to contact 105' of relay Y'B' if closed or contact 73'/74' of relay G'R', if closed to line 216N, line 219S to contact 105 of relay YB, if closed, or contact 73/74 of relay GR if closed, to line 216S, terminal T16 to line 216 of the parent controller.

If, however, the timing control as illustrated in Fig. 3*a* were employed, the lines 219 and 217 would form part of the circuit. This type of timing control circuit would be completed in parallel to each minor movement controller from line 219 through terminal T19, line 219N to the minor movement controller MMN, contact 74'/75' of relay G'R' if closed, and contact 106' of relay Y'B' if closed, line 217N, line 217P, terminal T17 to line 217 of the parent controller or via a parallel circuit from line 219, through terminal T19, line 219N, to the minor movement controller MMN, contact 105' of relay Y'B' if closed, or 73'/74' of relay G'R' if closed, lines 216N, 219S, to the minor movement controller MMS, contact 74/75 of relay GR if closed, contact 106 of relay YB if closed, to lines 217S, 217P, terminal T17 to line 217 of the parent controller. With such parallel circuits in the timing control circuit each minor movement controller could energize the relay TR, shown in Fig. 3*a*, by operation of its own contacts, to stop the timing of the parent controller as described below.

A third timing control circuit for control of the parent timing is also illustrated in a series circuit between the two minor movement controllers. This method of parent control, herein explained may not necessarily effect the parent timing but acts to keep the parent controller from advancing in its cycle out of its position 6'. The circuit for the parent control supplies a common ground contact to line 218 of the parent controller and, in order to halt the advance of the parent controller, the ground circuit is opened at either contact 170 of relay YC or at 170' of relay Y'C' or both. When complete the circuit is completed to line 218 of the parent controller through terminal T18, line 218S, contact 170 of relay YC when closed, lines 218GS, 218N, contact 170' of relay Y'C' when closed, line 218GN to common ground.

The relays of Fig. 2 are all illustrated as deenergized.

Fig. 3 is representative of the parent controller and is a part of a traffic control system and apparatus as disclosed in a U.S. Patent 2,156,138, issued April 25, 1939, but slightly modified for the purpose of the present invention as described below. This traffic controller may be used in a traffic system without the minor movement controller or in conjunction therewith.

It should be noted that the traffic system in which the minor movement controller may form a part is not limited to the present type of parent controller, but may use as parent controller, any of the familiar types of traffic controllers. The use of the controller shown in Fig. 3 is for the purpose of illustration and to show how the present invention will operate with such a traffic controller and in such a traffic control system, which is typical of its operation with other traffic controllers.

Fig. 3, as shown, is a form of a two phase full actuated type of traffic signal controller, representing for instance, the device named "Parent Controller" in Fig. 1 herein.

Ordinarily a signal controller of the form illustrated operating as a two phase, full actuated controller transfers right of way cyclically or in response to actuation between the main and cross streets, the length of the cycle and the portions of the right of way signal cycle accorded to the main and cross streets being dependent on or modified by actuation of the vehicle detectors in the streets. The vehicle actuated detectors may be of any type as herein discussed.

The controller may by manner of example include a cyclic switching mechanism having a plurality of contact pairs operated by a cam shaft which is moved step-by-step through a cycle by means of a solenoid. The contact pairs control signal illuminating circuits and control circuits.

The solenoid in this embodiment is controlled from a timing circuit employing a capacitor-gas discharge tube combination permitting variations in timing by the vehicle detectors as will be pointed out. Both minimum and maximum timing circuits are provided. The controller, it will be noted in Fig. 3 is arranged for operation from an alternating current supply (indicated by a plus in a circle and a minus in a circle, the input being line 20′), and suitable voltage transforming and rectifying arrangements are provided as for example a transformer XFR and a thermionic rectifier VLV, from which suitable potentials of direct current for operating the gas discharge tubes is obtained (at the terminals indicated by a plus in a square and a minus in a square).

The table at the right of Fig. 3 shows a development of the several cams C1 through C18 plus C20 through C22 and the positions of the cam shaft 1′ through 6′, in which the various cams are operating to close their respective contacts. In each position of the cam shaft a circuit for charging capacitor QA is completed over one of the interval adjustable resistances VA, IA, VB, IB, LA, or LB, which are wired to one end of the resistor R1 while the other end is connected to the capacitor QA which is then joined to the ground wire L2.

It will be noted that the present drawing, Fig. 3 here, differs from the presentation in U.S. Patent 2,156,138, but a similar effect is obtained. Maximum timing capacitor QB is charged similarly over adjustable resistors MXA or MXB, and through resistor R2 which is connected to QB and then through to ground wire L2 as will subsequently be explained. Adjustable resistors MXA and MXB are shown in straight rather than arcuate form but are equivalent to those of the said patent.

Operation of this controller as an independently operating full actuated controller will now be described.

Accordingly, under this type of operation the terminals O and Q would be connected to ground lead L2 through switch SW10, which would be closed. Such switch is not shown in the aforesaid patent presentation and is shown open herein, although for the description below of independent operation of the controller of Fig. 3, the switch SW10 will be assumed closed.

Terminal G is connected through Street A detector 401 to grounded power when the contacts of the detector are closed. Detector 402 for Street B is connected between terminal F and grounded power when the contacts of the detector are closed. Let it be assumed, for example that both switches PB and PA are open, and at the moment the cam shaft is standing in position 6′, the phase A or street A vehicle interval.

It will be noted that Fig. 3 herein, is presented with switch PB open and switch PA is closed. All other switches including the cam contacts are open except those having a heavy black mark in line 6′ in the "Shaft Positions" chart at the right of Fig. 3. The several timing intervals corresponding to the shaft positions are herein referred to as "A yellow" in position 1′, "B initial" in position 2′, "B vehicle interval" in position 3′, "B yellow" in position 4′, "A initial" in position 5′, and "A vehicle interval" in position 6′. All the relays and the solenoid in Fig. 3 are initially deenergized in this position 6′.

It may be worthy to note at this time several other changes from the aforementioned patent drawing.

The present drawing, Fig. 3, shows two detectors 401, 402 corresponding to the present Fig. 1, instead of two detectors DNS and DEW of the patent.

Line L–6 connecting terminal G to terminal 214 and line L–7 connecting terminal F to terminal 215 appear only in the present drawing. The extension of cam contacts C11, C10 and C20 to include L5 and 212 and signal lights 301, 302 and 303 connected to ground L2 have been inserted in the present drawing and differ from the above mentioned patent drawing.

The connections of cam contacts C9, C21 and C22 are extended to lines 211, 210 and 213, which are also modifications of the original patent drawing.

Switch SW11 and lines 219 and 216 are other modifications of the aforementioned patent drawing. Switch SW11 here shown open is a manually operated switch and lines 219 and 216 connect with the minor movement controller as seen in Fig. 4. It will be noted that this area of Fig. 3 is marked off with a broken line in the lower right corner of the figure.

A line 218 is also connected to lines O and Q, which line is also not shown in the said patent drawing.

However, it should be noted that when the present controller of Fig. 3 is operated as an independent full actuated controller, the A.C. input 20′ will be connected through switch SW11 and line L10 to the transformer XFR with no interruption of the circuit. To continue with the independent operation, power is supplied from the A.C. plus power lead 20′ over cam contacts C11 to grounded power L2 to cause the phase B (Street B) red signal 303 to be displayed, A.C. power is also supplied from 20′ through closed cam contact C9, here shown leading to line 211, thence in Fig. 4 via terminal T11′, line 211′ to PG relay, and to green signal 201 to ground 30, which in the assumed independent operation would ordinarily illuminate the green signal of phase A connected between cam contact C9 and ground lead L2.

Meanwhile capacitor QA is being charged by current from the rectifier VLV over D.C. plus lead L3, cam contact C4, a vehicle interval adjusting switch VA, resistor R1, capacitor QA to grounded lead L2 for timing a "vehicle interval" in this position 6′.

It will be assumed that a succession of vehicles is passing over the detector 401 in Street A resulting in intermittent operation of relay ER, over a circuit from input 20′ through relay ER to terminal G, and via closed contact 401 to grounded lead L2. A circuit shunting capacitor QA over low resistor YD and cam contact C5 is thus intermittently completed through closed contact E2 from ground line L2, thus reducing the charge on capacitor QA, to reset the vehicle interval timing and extend the A green period.

If now a vehicle arrives on Street B and actuates the detector 402 the relay DR is energized by a circuit from A.C. input 20′ through relay DR to terminal F to closed contacts 402 to grounded lead L2. Relay DR is energized and locks in over its contact D1, completing a circuit from A.C. input 20', through relay DR, closed contact D1, cam contact C7 to grounded lead L2. Contact D2 is closed and completes a circuit from grounded lead L2 through closed switch SW10, contact D2, cam contact C6, through relay AR and tube FA paralleling capacitor QA. Also, contact D3 completes a timing circuit to charge maximum capacitor QB from the D.C. plus lead L3 over cam contacts C1, contact D3, phase A maximum interval switch MXA, resistor R2, and capacitor QB to grounded power lead L2. The combination of variable resistor MXA and resistor R2 is substantially higher in resistance than the combination of variable resistor VA and resistor R1, so that the maximum time limit is considerably longer than the vehicle interval.

Subsequently, due either to a gap of sufficient size between actuations by the Street A traffic, permitting capacitor QA to become charged to the flash potential or ionizing voltage of the tube FA, now completed in parallel with the capacitor, or due to the charge on the maximum capacitor QB reaching the flash potential of tube FB, either tube FA or FB will become conducting whereupon either relay AR or BR, as the case may be, is operated. At armature A1 or B1, a circuit is thus completed from lead 20' through solenoid SR to lead L2 while relay AR or BR is momentarily operated, to energize solenoid SR. Energization and deenergization of solenoid SR causes the cam shaft to be advanced by a ratchet mechanism (not shown), to the next position, position 1'.

As the maximum timing circuit is initiated upon actuation of the detector in the lane not having right of way, it assures that the actuating vehicle will be forced to wait at most no longer than the period of the maximum timing circuit before right of way is transferred.

In its energizing position the solenoid SR completes a circuit over its contact S1, capacitor QA and low resistor YA, short circuiting capacitor QA so that whenever the solenoid operates to advance the cam shaft to the next interval, time will start with an initial capacitor voltage of substantially zero. Similarly contact S2 completes a discharge for capacitor QB over resistor YB'. In position 1', cam contact C9 opens and C21 closes so that phase A yellow signal 209 (shown in Fig. 4) and phase B red signal 303 are illuminated, and the phase A green signal 201 (shown in Fig. 4) is extinguished. Capacitor QA is charged from lead L3 over cam contact C13, variable switch LA, resistor R1, capacitor QA and ground lead L2. Tube FA and relay AR are connected across the capacitor over cam contact C6 and relay contact D2, and when the voltage of capacitor QA reaches the flash voltage of tube FA, the relay AR and solenoid SR are operated, and the cam shaft is advanced to position 2' in the manner described above.

In position 2' the Street A yellow signal 209 and Street B red signal 303 are extinguished and the right of way is accorded to Street B as cam contacts C20 and C22 are closed to illuminate phase A red signal 202, as shown in Fig. 4, and phase B green signal 301 in Fig. 3.

In order to provide a sufficient period for the starting up of any phase B traffic which may be waiting, an initial non-extendible interval of right of way is now timed. Capacitor QA is charged from lead L3 over cam contact C14, adjustable resistance IB, resistor R1, capacitor QA to grounded lead L2, until the voltage across the capacitor reaches the flash potential of tube FA, which then becomes conducting and causes the charge on the capacitor to operate relay AR, and this in turn energizes solenoid SR, advancing the cam shaft to the phase B vehicle interval position 3'.

Here no change is made in the signal indicating circuits but relay DR holding circuit is broken at cam contact C7. Relay DR had locked in over contact D2 to complete a holding circuit, as described previously through cam contact C7, and now cam contact C7 is open and the circuit is broken deenergizing relay DR and opening contact D1. Now relay DR operates intermittently under the control of traffic on Street B actuating the detector 402 (or 402' as shown in Fig. 1), thus extending the right of way period in a manner similar to that described for relay ER by street A traffic actuation in position 6'. Also in position 3', as in position 6', previously explained, the maximum interval or the extendible vehicle interval shall terminate to operate either tube FA or FB and cause the cam shaft to advance to the next position 4'.

Operation of the controller through positions 4' and 5' is similar to that described for positions 1' and 2', excepting of course, that the right of way is leaving phase B traffic in position 4' with yellow signal 302 illuminated by closure of cam contact C10 and right of way is being accorded in position 5' to phase A traffic for an initial non-extendible interval. The charging circuit in position 4' extends through cam contact C2, adjustable resistance LB, resistor R1, capacitor QA to grounded lead L2 for timing clearance interval of phase B. In position 5' the charging circuit is through cam contact C3, adjustable resistance IA, resistor R1, capacitor QA to grounded lead L2. At the end of the interval in position 5', the initial interval of phase A, the cam shaft is advanced in a manner previously explained, into position 6', thus completing one entire cycle of the controller, whereupon the cycle described is repeated in accordance with traffic actuations.

If transfer of right of way from one road to the other at the end of the vehicle interval position 3' or 6' occurs by operation of the maximum time circuit relay BR, contact B2 closes to place the controller in a condition to remember vehicles cut-off so that the right of way will be retransferred to them as soon as possible. This is obtained by momentarily connecting relay DR and ER. For instance, if right of way is on Street B and waiting vehicles on Street A have energized and locked in relay ER, and if Street B vehicle interval, position 3' is terminated by operation of relay BR, a circuit to energize relay DR is completed from AC plus lead 20' through relay DR, contact B2, contact E1, cam contacts C18 to grounded power lead L2. Solenoid SR, which operates immediately upon energization of relay BR, provides at contacts S3 a lock-in circuit over contact D1 for relay DR, which holds until the cam shaft has been moved to position 4' where the lock-in circuit over cam contact D1 for relay DR, over cam contact C7 becomes operative. Similarly, assuming for the moment that switch PA is open, if right of way on Street A is terminated by operation of the maximum timing circuit, relay ER is left energized to cause subsequent retransfer to Street A.

The arterial or recall switches PA and PB, when closed, ensure that right of way will return to the associated phase even in the absence of traffic thereon. Their effect, as will be seen from the circuit, is to simulate operation of the detectors, while their associated phase is not receiving right of way, although they cannot produce any extension effect when their respective phase has right of way.

When operating as a semi-actuated controller, the Street A detectors 401 and 401', as shown in Fig. 1, are disconnected from terminal G, and relay ER is operated only by switch PA in cooperation with cam contacts C18. Accordingly, when right of way is transferred to Street B for the duration of positions 2' and 3', the Street B initial and vehicle intervals, energization of relay ER by the circuit from power lead 20' through relay ER, switch PA (when closed), cam contacts C18, to grounded power lead L2 causes right of way to be retransferred to Street A by operation of either the minimum or maximum timing circuits. Accordingly, in semi-actuated operation, the right of way will normally remain on Street A, being transferred to Street B for a predetermined minimum period in response to actuation of the Street B detector 402. The right of way will remain on Street B for an additional period if there are further actuations of detector 402 within the maximum limit. However, right of way is then retransferred to Street A from which it cannot again be transferred before expiration of a minimum period comprising the initial interval, position 5', and a vehicle interval, position 6', in which the minimum timing capacitor QA charges, without any discharge or resetting, to the flash potential of its associated tube FA.

The parent controller of Fig. 3 is held in a certain position 6' of its cycle by action of the minor movement controller of Fig. 4, when the latter is actuated, and one method for such control is by interrupting the connection of wires O and Q to ground in certain positions of the rotary stepping switch of the minor movement controller for example, as hereinafter fully described. It will also be seen that in other positions of the rotary stepping switch of the minor movement controller the ground connection is completed.

During the time when wires O and Q are not connected directly to ground during Street A vehicle interval, position 6', the operating circuit for tube FA and relay AR is not completed in shunt with capacitor QA and the circuit through tube FB and relay BR is not completed in shunt with capacitor QB. Consequently neither relay AR nor BR can operate to advance the controller from position 6' to transfer right of way to Street B until wires O and Q are connected by the external control to ground, completing these shunt circuits even though other conditions for carrying out such transfer may be otherwise fulfilled.

The independent operation of the traffic signal controller represented in Fig. 3 having been heretofore described, which is similar to its operation as a parent controller in absence of actuation of the minor movement controller, there will now be described more fully how the said traffic controller of Fig. 3 is used in a traffic control system in coordination with the minor movement controller of Fig. 4, in accordance with the present invention.

Referring again to Fig. 3, it will be noted that cam contacts C11 and C20 complete a circuit to illuminate red signal 303 and green signal 301 respectively showing on Street B when the cam contacts are closed. Yellow signal 302 is also illuminated directly by cam contact C10 when it is closed, but line L5 is tapped off this circuit and goes to the minor movement controller in Fig. 4 through line 212.

Referring now to Figs. 3 and 4, cam contact C21 when closed illuminates yellow signal 209 (shown in Fig. 4), the line from cam contact C21 being illustrated as passing across the minor movement controller through line 210, terminal T10 and line 210' is shown extending across the minor movement controller for convenience or clearness in Fig. 4, the broken lines C210 indicating that the line 210' is separate from and external to the minor movement controller.

Cam contact C9 when closed illuminates the green signal 201 of Street A, via circuit into the minor movement controller through line 211, terminal T11, line 211', via contact 72 to signal 201, and also via a branch circuit at line 211' energizes relay PG, and when cam contact C22 closes it illuminates the red signal 202, through the minor movement controller through line 213, terminal T13, line 213', all as described below.

Line L7 (Fig. 3) is connected to terminal F and leads into the minor movement controller via line 215 (Fig. 4), terminal T15 and line 215' to register a call for phase B, as described below, while line L6 (Fig. 3) is connected to terminal G and leads into the minor movement controller through line 214, terminal T14 and line 214' to register a call for phase A, as described below, when the respective circuits through the minor movement controller are completed to ground.

In order that the timing of the cycle of the parent controller is stopped during the time the minor movement controller has control of the intersection, as described later, the switch SW11, which has heretofore been assumed to be closed, is opened as shown in Fig. 3, and the A.C. input 20' is connected into the minor movement controller, through the connections of lines 216 and 219 as is completely described hereinafter.

As more fully described below, line 219 is an input from the parent controller into the minor movement controller, and the circuit follows through several contacts in the minor movement controller and emerges at line 216 which is connected to the transformer XFR via line L10. The minor movement controller controls the several contacts through which the power lead 20' via line 219, must follow to connect with the line L10 and transformer XFR via line 216 so long as switch SW11 is open.

By opening or closing the contacts, as the case may be, the minor movement controller can either close or open the power circuit between line 219 and line 216 and thereby control the timing of the parent controller through control of the power operating transformer XFR. Another method to control the timing shall be discussed hereinafter with reference to Fig. 3*a*. The above described connections relative to the control of the power circuit to the transformer XFR in the parent controller, control the timing in the parent controller and will effectively increase the time of the cycle of the parent controller, whenever the minor movement controller inserts the minor phase into the normal cycle of the parent controller.

If it is desired to insert the minor phase via the minor movement controller, without increasing the time of the cycle, the means provided to stop the timing as previously explained, during the minor phase, is eliminated. Transformer XFR (Fig. 3) is connected to the A.C. input 20' via closed switch SW11 and line L10 but the switch SW10, joining O and Q to ground L2 is opened breaking the lead to ground. This leaves the connection to ground to be made through line 218 which line follows into the minor movement controller and through the bank B of the rotary stepping switch (as seen in Fig. 4). Switch 149 in Fig. 4 will be opened and as explained in detail hereinafter the ground connection through positions 6, 7, 8 and 9 of the minor movement controller are broken. This lack of ground connection through lines O and Q results in holding the parent controller in its position, as previously explained, while the parent controller times the interval of the phase associated with the position of the cam shaft that it is in at the time.

Other connections and reactions within the minor movement controller having additional effects on this particular situation will be fully explained in the description associated with Fig. 4.

Reference is now made to Fig. 4 which is a schematic presentation of the preferred form of the minor movement controller, with connections to the parent controller. At the lower right of Fig. 4, marked by the broken line 200, are externally located detector 101, and the signal lights 201 to 209 grounded to a common ground 30. At the lower left marked off by the broken line marked 200' and called "parent controller" is the power input 20' of the parent controller, which may be the same as input 20 of the minor movement controller, and the several connecting terminals and switches located in the parent controller and connected to the minor movement controller. The cam contacts C9, C10, C22 and C21 of the parent controller shown in Fig. 3 are illustrated here in Fig. 4 as switches that are similarly numbered.

The rest of Fig. 4 is the schematic of the minor movement controller, with its alternating current input 20 of approximately 120 volts, which is used to illuminate the external signals 202 through 208, signals 201 and 209 being illuminated by the input 20' in the parent controller. The several relays MD, AS, BS, MM, YC, PR, PG, YB, YR and GR control a plurality of contacts. Relay MD controls contacts 88, 89, 116/117 and 117/118; relay AS controls contact 94; relay BS controls contacts 123 and 124; relay MM controls contacts 125, 54 and 52; relay PR controls contacts 97/98, 98/99 and 102; relay PG controls contacts 70, 71 and 96; relay YB controls contact 90/91, 91/92, 106, 106, 103, 108, 109 and 161; relay YR controls contacts 111/112, 112/113; and relay GR controls contacts 82/83, 83/84, 76/77, 77/78, 104, 73/74, 74/75, 58 and 72.

The alternating current input 20 is used to energize relay YR and GR while the alternating current input 20' of the parent controller energizes relays PR, YB and PG through the respective terminals and switches in the parent controller.

The alternating current input 20 is also used to obtain an alternating current low voltage supply, 21, of approximately 12 volts by use of a familiar step-down transformer, for example (not shown here). The low voltage alternating current, 21, is used to energize relays MD and MM and to apply a small alternating current potential on the cathode 22 of tube 25 via a potential divider made up of resistors 26 and 28 on line 27.

The direct current input 31, on the order of 350 volts for example, may be obtained by the use of any of several familiar methods if direct current is not available on location. The direct current supply is used for timing. There are two timing circuits. One is made up of timing capacitor 49, the timing charging resistor 42, relay BS, tube 35 and the associated reset discharge resistor 51. A second circuit is made up of timing capacitor 50, one of the timing charging resistors 44, 46, 48 and 131, relay AS, tube 25 and the associated reset discharge resistor 53. The timing method used may be any of the several electrical, mechanical, or electronic methods or any combination of them. The preferred timing method here used is an electronic method employing a capacitor-gas discharge tube combination to energize a relay at the end of the timed period.

The direct current supply 31 is used to charge the capacitors 49 and 50 through a potential divider made up of resistors 132, 133 and 134 to control the amount of voltage, which voltage is tapped off by taps 37 through 40 and 129, any of which may be connected to any point on resistor 133. The resistors 41 through 48, 130 and 131, below the respective taps, control the rate of current flow into the timing elements of the respective circuits. Resistors 42, 44, 46, 48 and 131 are adjustable via their respective taps 56, 36, 119 and 126 and 145 so that the rate of current flow may be adjusted to control the timing as desired.

One timing circuit, used primarily to set a maximum limit to the minor movement green period, is charged from direct current input 31, through resistor 132, part of resistor 133, tap 37, resistors 41 and 42, tap 56, and via switch 58 if closed, or if open, then via resistor 57, line 59, timing capacitor 49, line 60, and returning via line 121, point 122, line 122; line 93 to ground 30. Relay BS is connected in shunt with capacitor 49 via line 59, relay BS, anode 34 and cathode 32 of tube 35 (when conducting), line 154, point 29' to ground 30. Discharge resistor 51 and switch 52 are connected between line 60, the input side of timing capacitor 49 and line 121, the ground side of capacitor 49 to shunt and discharge the capacitor when switch 52 is closed.

The charging circuit of the second timing circuit is determined by the wiper contact F' of the rotary stepping switch as it makes contact with the contacts 1 through 11 of bank F, as described below.

The control grids 23 and 33 of the tubes 25 and 35 respectively have an applied bias of approximately 45 volts for example, to hold the tubes from conducting until this bias is reduced. This bias is controlled by the positions of the wiper contact E' on the contacts 1 through 11 of the bank E of the rotary stepping switch, which may close a circuit from line 64 through wiper contact E' to ground 30, which completes a circuit from direct current minus 61, through resistor 62, point 65, resistor 63 to line 64. The control grid potential is applied at point 65', and when the circuit is complete the bias is reduced to approximately minus 14 volts for example so that the tubes 25 and 35 may fire if their respective associated timing capacitors are sufficiently charged.

The selection of circuits as made by the several contacts with the rotary stepping switch may be obtained by various methods. The method here utilizes a rotary stepping switch which is the familiar type switch commonly associated with telephone circuits. There are six banks A, B, C, D, E, and F of 11 positions 1 through 11. Contact is made upon each bank of the rotary switch by a set of bridged wipers A', B', C' and D', respectively. Wipers E' and F' are not bridged.

The wipers are attached to a shaft that is rotated by motor magnet MM which when energized notches a ratchet gear (not shown) on the shaft, and when then deenergized rotates the shaft so that the wipers advance from one position to the next, in unison. As the wipers leave position 11, it is assumed that they next make contact with position 1, as by multiple sets of wipers for example, as well known in the art. The contacts 101 represents the detectors contacts 101 and 101' which and are externally located as seen in Fig. 1.

The manual switch or pushbutton 102' is representative of a manual switch which may be used for direct operation of motor magnet MM for manual control of the minor movement controller if desired.

The lights 66, 67, 68, and 69 are indicator lamps and are used to indicate, in the case of the 12 volt lamp 66, when the MD relay is energized, and in the case of lamp 67, when the yellow signal 207 is illuminated and/or when the YB relay is energized, and in the case of lamp 68, when the yellow signal 204 is illuminated and the clearance interval of the minor phase is being timed, and in the case of lamp 69, when the signal 203 is illuminated which is the green signal of the minor phase. These lamps may be 120 volt neon lamps for example.

The contacts C21, C22, C10, and C9 in the area marked off by the broken line 200' and named "Parent Controller" represent the cam contacts of similar number illustrated in the parent controller in Fig. 3. The cam contacts are connected to terminals, represented by small circles, via lines 210 for cam contact C21, line 213 for cam contact C22, line 212 for cam contact C10 and line 211 for cam contact C9.

The lines 218, 216, 219, 217, 215, and 214 of the parent controller are also connected to terminals. The several terminals represented by the small circles, as T10, T11, etc., may be considered to have the same number as the line to which they are connected with the substitution of a T for the first digit 2. Several terminal points are numbered for example T18, T16, T17, T15, and T10. Certain others of the terminal points are not numbered to prevent overcrowding in the drawing.

The minor movement controller is connected to the parent controller via connection to these several terminals. The lines 210, 211, 212, and 213 are output lines from the parent controller, while the lines 214, 215, 216, 217 and 218 are output lines from the minor movement controller in the sense that the latter exerts some control over the parent controller over these lines. The line 219 is an output from the alternating current supply 20' of the parent controller.

Phase A major, as shown in Figs. 5, 6 and 7, is part of the cycle of the parent controller and consists of green signals 201 and 201' followed by yellow signals 209 and 209' showing on Street A, red signals 303 and 303' showing on Street B and red signals 205 and 205' showing on the minor traffic lanes, as shown on Fig. 1.

Each phase is normally made up of timed traffic signal periods, the green signal period of the phase followed by a yellow signal period, while other signals are illuminated as indicated in Figs. 5, 6 and 7. The time that the green signal is illuminated in each case may vary as it includes non-extendible initial interval followed by an extendible vehicle interval, with a maximum interval so that the extendible vehicle interval may not be extended indefinitely.

The minor movement controllers MMS and MMN illustrated in block form in Fig. 1 and Fig. 2 are identical to the minor movement controller illustrated in schematic form in Fig. 4, but for convenience of reference a few parts or interconnecting lines of the minor movement controller of Fig. 4 have had identifying letters N or S added in Fig. 2 in designating the corresponding parts in the respective controllers, and some of the external parts such as detectors and signals are individually associated with the respective controllers MMN and MMS as shown in Figs. 1 and 2, and have primes added to the identifying members in Figs. 1 and 2.

Thus the description below in reference to Fig. 4 can be considered as applying to either one of these minor movement controllers and to the parent controller, with detector 101 and signals 203 to 208 as is for controller MMS and with primes added for controller MMN for example, and with signals 201, 202 and 209 as is for controller MMN and with primes added for controller MMS. Although the inverted signals 206, 207 and 208 are shown in Fig. 4 and may represent the corresponding signals 206', 207' and 208' for controller MMN, these signals are shown only in Fig. 4, since they may have no application to the intersection of Fig. 1 but may have application under some conditions.

Keeping the above in mind, consider first the general cooperative action of the parent controller and the minor movement controller through a cycle of operation, with reference to Figs. 1–7, but without tracing the detailed circuits.

It will be noted referring to the phase sequence in Figs. 2, 5, 6 and 7, that the minor phase splits phase A into two parts, phase A minor and phase A major when the minor phase is inserted into the cycle.

Assume that the minor movement controller has been actuated in advance and the parent controller has reached position 4' and completed its timing of this phase B yellow period.

Operationally when the parent controller moves into its position 5', the initial interval of phase A major, the minor movement controller moves into its position 6, and the minor movement controller stops the timing of the parent controller so that the parent controller does not change its position while the minor phase is shown. While the parent controller remains in position 5', the minor movement controller advances from its position 6, the non-extendible initial interval of the minor phase green, to its position 7, the minor extendible vehicle interval green, and then to position 8 the minor clearance interval yellow, and then into position 9. The minor phase thus ending, the phase A major part of phase A begins, under control of the parent controller timing, as such timing is no longer stopped by the minor movement controller.

The minor movement controller continues through positions 10 and 11 quickly step by step to its position 1, and the parent controller will continue through its position 5' to position 6', where it will rest or continue further depending on absence or presence of actuation on phase B or further actuation on phase A minor.

The extendible vehicle interval of the minor phase cannot be extended indefinitely as there is a maximum interval timer in the minor movement controller to advance the rotary stepping switch at the termination of a maximum time period. The green signal 203 of the minor phase will be extinguished either by the completion of the initial interval plus the completion of the vehicle interval or by the completion of the initial interval plus the completion of the maximum time interval, whichever is completed first in time.

It will now be assumed that the parent controller is resting in its position 6', which is the extendible vehicle interval of phase A major, when a cycle is initiated by traffic actuation of the minor movement controller. The signals illuminated in phase A major will show in this initial resting condition. Referring to Fig. 1, these are green signals 201 and 201' on Street A, red signals 303 and 303' on street B and red signals 205 and 205' on the left turn of Street A.

Now assume a call is received as a vehicle crosses one of the detectors 101 or 101' in one of the left turn lanes. When the vehicle crosses the detector, the corresponding contacts of 101 or 101' are closed and a circuit is completed to the minor movement controller. The completion of the circuit causes the relay MD to be energized and results in certain internal reactions in the minor movement controller, as hereinafter explained in detail.

The minor movement controller, having been at rest in position 1, now advances into position 2 and through line 215' causes a call to be sent to the parent controller to change from phase A major to phase B in its cycle. The parent controller, with such call for phase B, advances into its position 1', as soon as traffic ceases on phase A major or upon the maximum limit in event of continuous such traffic. Position 1' is the clearance interval of phase A major, and shows a yellow signal 209 and 209' as the green signals 201 and 201' are extinguished.

The minor movement controller advances into position 3 at this time and puts in another call through line 214' for a return to phase A after the completion of phase B. At the end of the clearance interval the parent controller advances into its position 2', the initial interval of phase B, and shows green signals 301 and 301' on Street B. Red signals 202 and 202' on Street A and red signals 205 and 205' on the minor traffic lane are maintained illuminated by the minor movement controller. The minor movement controller advances from its position 3 to its position 4 and waits in its position 4.

The parent controller is now in position 2, the initial interval of phase B, and next advances to position 3' and then to position 4'. Position 3' and 4' of the parent controller are similar to positions 6' and 1' except that during positions 3' and 4' phase B signals are illuminated, and in positions 6' and 1' phase A signals are illuminated. The parent controller advances from position 3' to position 4' in response to the call previously placed for phase A by the minor movement controller as described above, such advance occurring on completion of timing of the vehicle interval in absence of phase B traffic or by cessation of such traffic or on completion of timing of the maximum limit in event of continuous phase B traffic.

When the parent controller moves into position 4' the minor movement controller moves into its position 5 of its rotary stepping switch and the parent controller illuminates the yellow signals 302 and 302' of phase B. As the parent controller moves into its position 5', the initial interval of phase A major, the minor movement controller moves into its position 6. The minor movement controller then, by appropriate contacts, stops the timing of the phase A major initial interval, illuminates the red signals 202 and 202' on Street A instead of the green signals 201 and 201' on Street A, illuminates the green signals 203 and 203' of the minor phase on the minor traffic lane, and begins to time its initial interval of the minor phase. At the termination of the initial interval of the minor phase the minor movement controller advances into its position 7, as all signals hold, and the extendible vehicle interval and the maximum time interval of the minor phase are timed in the minor movement controller.

It should be noted here that the maximum interval of the minor movement controller starts being timed as soon as the minor movement controller moves into the extendible vehicle interval position 7, while the maximum interval of the parent controller only starts being timed when the parent controller is in the extendible vehicle interval of the particular phase (position 6′ for A or position 3′ for B) and a call has been received from the phase on which the right of way, at that particular time, is interrupted.

As the minor movement controller moves from its position 7 to its position 8, via the action of the maximum timer or vehicle timer, as previously explained, the green signals 203 and 203′ of the minor phase are extinguished and the yellow signals 204 and 204′ of the minor phase are illuminated while the clearance interval of the minor phase is timed. At the termination of the clearance interval the minor movement controller moves into its position 9 and extinguishes the yellow signals 204 and 204′ and illuminates the red signals 205 and 205′. The minor movement controller now allows the parent controller to begin timing its initial interval since the parent controller is still in its position 5′. The green signals of phase A major 201 and 201′ are illuminated and the red signals of phase B remain unchanged.

The minor movement controller now, without regard to the parent controller steps quickly from its position 9 to 10 to 11 and then to 1 and rests, without interfering with the parent controller moving into its position 6′, its rest position of phase A major, ready for further response to traffic.

It should be noted that the parent controller can rest in two separate positions, the vehicle interval of phase A major, with the minor phase having preceded the phase A major (position 6′), or without the minor phase preceding the phase A (position 6′), or the vehicle interval of phase B (position 3′) of the parent controller.

If the parent controller was resting in phase A major (position 6′), with or without the minor phase having preceded the phase A major, the steps of both the parent controller and the minor movement controller through their respective cycles would be as previously explained. However, a call from the minor movement controller may be received while the parent controller is resting in phase B (position 3′) the second rest position or in any position while the parent controller is advancing in its normal cycle.

If a call from the minor movement controller is received by the parent controller while the parent controller is in its position 5′ the steps will be the same as those previously described for position 6′.

If the parent controller is in its position 5′ or 6′, phase A major green, during the initial advances of the minor movement controller, the minor movement controller will advance from its position 1 to its position 3 and wait until the parent controller advances into its position 1′ and then, upon such advance the minor movement controller will advance into its position 4 and wait until the parent controller reaches its position 4′.

If a call is received while the parent controller is in its position 1′, the yellow position of phase A major, 2′ or 3′, the intial green position and vehicle green position of phase B respectively, the minor movement controller will advance from its position 1 to its position 4 and wait until the parent controller moves into its position 4′. Then the minor movement controller will move into its position 5, and as the parent controller moves from its position 4′ to 5′, the minor movement controller moves from its position 5 to 6 and follows a procedure as previously explained.

It should be noted that as previously explained, the advancement of the parent controller from its position 6′, the phase A major rest position, through the cycle, was caused, in the description, by the minor movement controller sending, in its position 2, a call to the parent controller for phase B and in its position 3, a call for a return to phase A. If a call is received by the minor movement controller as it is at rest, while the parent controller is either on its way into phase B, that is, in its position 1′, or in phase B, its position 2′ or 3′, a call through position 2 of the minor movement controller for phase B would not be made because of open contact 70 of the PG relay in the minor movement controller.

The call made by the minor movement controller for phase A, through position 3 of the minor movement controller is made in due course of the advancement of both the parent controller and the minor movement controller, no matter where in relation to the positions of the parent controller the call to the minor movement controller is received.

If, however, a call is received while the parent controller is in its position 4′, the yellow position of phase B, the minor movement controller will remain in its position 1 until the parent controller moves into its position 5′ and the previously described procedure will follow.

It should be noted that the present device has a memory feature, if for example, the minor movement controller is operating and is in its position 8, the clearance interval of phase A minor, and a vehicle crosses one of the minor detectors, the call is sent to the minor movement controller but since the clearance interval is not extendible it is assumed that the vehicle had not sufficient time to clear the intersection because of the time of the clearance interval. Therefore, the call is held in the minor movement controller, as the minor movement controller steps from position 8 through to 11 and then to 1, and, as the parent controller moves into its phase A major, the call that was received during the position 8 of the minor movement controller is now transmitted to the parent controller as if the call had just been received, in order to call for a return of the minor phase to allow the vehicle to clear the intersection without a subsequent call through the minor phase detectors.

It should be noted that the minor phase is inserted into the cycle of the parent controller before the major part of the phase with which it is associated. Here we assume the minor phase to be associated with phase A but it may be associated with phase B or, in the case of the use of two minor movement controllers, one minor phase may be associated with phase A and the other minor phase associated with phase B.

In order that the minor phase be inserted into the cycle of the parent controller at the beginning of its associated phase, certain preparation must be made by the minor movement controller and the parent controller. The minor movement controller must advance from its rest position 1 to position 5, which is the position before the minor movement controller takes over control of the intersection and stops the timing in the parent controller. The parent controller must also advance in its cycle to position 4′ from any other position that it may be in when it receives a call or calls from the minor movement controller.

If the minor movement controller receives a call from its detectors while the parent controller is in its position 4′ the minor movement controller must remain in its position 1, and hold the call. The minor movement controller is held in position 1 by the energized relay YB holding its contact 90/91 open, as will be explained in detail hereinafter, until the parent controller advances into its position 5′. The minor movement controller is then permitted to advance from its position 1 to its position 3, where it waits for the parent controller to reach its position 1′ after which the minor movement controller proceeds to its position 5, as the parent controller advances to its position 4′ as previously described as if the call had been received while the parent controller was in its position 5′ or 6′.

If the parent controller is in any other position except 4′, the minor movement controller starts immediately from its position 1 after the minor movement controller receives a call and, as the parent controller advances in its cycle to its position 4', the minor movement controller advances to its position 5, as previously described. These separate advances are coordinated as will be seen in the description hereinafter.

Accordingly, the minor movement controller will arrive in its position 5 and the parent controller will arrive or be in its position 4', and each will advance to the next position almost together. Thus, as the parent controller moves into position 5', which is the beginning of the phase A green period, the minor movement controller will move into its position 6, which is the beginning of the minor phase green period.

If the minor phase were associated with phase B, the action in position 1' in the parent controller would be similar to that in position 4' as described above and the action in position 2' would be similar to that in position 5' as described above.

Below is a table that is designed to present a convenient reference to the reader to show, for example, some of the coordinated action as the minor movement controller advances, step by step through its cycle, from position 1 through 11 of the rotary stepping switch.

In each position the table will show: the signals displayed by the minor movement controller; (MR for minor red, MY for minor yellow, MG for minor green, IMR for inverted minor red, IMY for inverted minor yellow and IMG for inverted minor green), which device controls the timing (either PC for parent controller or MMC for minor movement controller); and some of the actions of the minor movement controller or what the minor movement controller is waiting for accordingly. The letters G and R refer to green and red respectively.

The alternate modes of operation of positions 9 and 10 depend upon the position of switches 149 and 145/146 in the minor movement controller, as will be described hereinafter.

A complete description and explanation is presented hereinafter but this table may be of assistance in that it summarizes certain of the actions of the minor movement controller as it advances in its cycle through the several positions of the rotary switch.

| Positions of MMC Stepping Switch | Signal Displayed by MMC | Timing Controlled by— | Action |
|---|---|---|---|
| 1 | MR and IMG | PC | Normal rest—wait for call. |
| 2 | MR and IMG | PC | Call parent to phase B if phase is in phase A—no call if parent is in phase B. |
| 3 | MR and IMG | PC | Call parent to phase A. |
| 4 | MR and IMG | PC | Wait for relay YB to energize clearance interval of phase B. |
| 5 | MR and IMY | PC | Wait for relay YB to deenergize. |
| 6 | MG and IMR | MMC | Stop parent timing—MMC times minor phase initial interval—MMC controls phase A major G+R signals. |
| 7 | MG and IMR | MMC | Hold parent timing stopped—MMC times minor phase vehicle interval (Extendible)—MMC controls phase A major G+R signals. |
| 8 | MY and IMR | MMC | Hold parent timing stopped—MMC times minor phase clearance interval—MMC controls phase A major G+R signals. |
| 9 | MR and IMG | MMC or PC | Alternate A—return timing control to parent and this is an MMC absorbing step. Alternate B—MMC continues control of parent timing to time phase A major minimum green. |
| 10 | MR and IMG | PC | Alternate A—absorbing step of MMC. Alternate B—returns timing control to parent. |
| 11 | MR and IMG | PC | Absorbing step. |

The following is a description of what occurs in the circuits of the minor movement controller as aforesaid. Before the call is received the minor movement controller will be resting in its position 1 of the rotary stepping switch. The signal lights as illustrated in Fig. 1 are in phase A of the cycle, i.e. a green signal showing for phase A major traffic and a red signal for all other traffic. In Fig. 4, when the minor movement controller is resting, the timing capacitors 49 and 50 are being charged. Capacitor 50 charges from the direct current power 31 through resistor 150, position 1 of bank F, wiper contact F', line 151, line 152, to capacitor 50. Capacitor 49 charges from the direct current power 31 through resistor 132, part of resistor 133, tap 37, resistors 41 and 42, tap 56, resistor 57, line 59, line 60 to capacitor 49.

After sufficient time both capacitors will become fully charged. Capacitor 50 will normally become fully charged before capacitor 49. The tubes 25 and 35 cannot fire even though the timing capacitors may become fully charged because the tubes are negatively biased at approximately 45 volts, for example, to cut off any flow of current through both tubes.

This bias potential is derived from point 61, the direct current minus power terminal, which is more negative than ground 30 by reason of the potential divider between direct current power 31 and the minus terminal, point 61, which includes resistors 132, 133 and 134 in series between point 31 and ground 30, and resistors 127 and 128 in series between ground line 30 and point 61. The bias potential at point 61 is extended through resistor 62 to point 65 to point 65', through resistors 137 and 140 to grid 33 of tube 35, and through point 65', resistors 138 and 139 to grid 23 of tube 25. Capacitors 141 and 143, and 142 and 144 serve to stabilize the biasing action in connection with the several resistors.

The relay PG, as shown in Fig. 4 is energized from the alternating current input 20' in the parent controller, through closed cam contact C9, line 211, terminal T11, line 211', relay PG, to ground 30. The parent controller closes this cam contact when the parent controller is in its position 5' and 6' of its cycle. Contact 72 of deenergized relay GR is closed to complete a circuit of alternating current from input 20' in the parent controller through cam contact C9, line 211, terminal T11, line 211', contact 72, through signal 201 to ground 30, thereby illuminating the green signal of phase A major.

A circuit is complete from the alternating current input 20 through contact 76/77 of relay GR, via line 79, line 80 through red signal 205 to ground 30. This is the red signal of the minor traffic lane that is illuminated while the minor movement controller is at rest.

Contact 82/83 of relay GR is closed to complete a circuit from alternating current input 20, via contact 82/83, through green signal 206, to ground 30, to illuminate this green signal, one of the inverted minor A series of signals, the use of which shall be discussed hereinafter.

Relay MD, the detector relay and relay MM, the motor magnet are both deenergized, as are relays AS and BS in the timing circuits.

Relay PR is also deenergized. It is energized during the phase B periods when the parent controller closes cam contact C22. The relay PR controls certain contacts, hereinafter explained, that cause a circuit to be completed to illuminate the red signal for phase A major traffic.

Relay YB is also deenergized as it is only energized during the clearance interval of phase B. Relays GR and YR are also deenergized in this position 1.

The signals 301, 302, and 303, the phase B signals, discussed and shown in Fig. 3 are controlled directly by the parent controller.

It will here be assumed that the minor movement controller shall control the timing of the parent controller via direct control over the continuity of the circuit between the alternating current input 20', in the parent controller and the transformer XFR in the parent controller. This method, as previously discussed with reference to Fig. 3, controls the continuity of the alternating current input circuit to the transformer XFR via control of contacts 73/74 of the GR relay and 105 of the YB relay in the minor movement controller.

Switch SW11 is open so that the power circuit, from 20' is completed through line 219, terminal T19, line 219', contact 73/74 of GR relay, or contact 105 of YB relay, line 216', terminal T16, line 216, to line L10 to transformer XFR. This completes circuit can be traced by using both Fig. 3 and Fig. 4.

Let us assume a call is received by the minor movement controller from a vehicle crossing over one of the detectors in one of the left turn lanes of Street A, and thus closing one of the contacts 101 or 101'. This completes the minor detector circuit from the alternating current 101 or 101' to ground 30. A parallel circuit from point 86 through lamp 66 to point 87 illuminates indicator lamp 66 when the relay MD is energized.

The relay MD thus energized closes contact 88 of the MD relay which provides a lock-in circuit and shunts detector 101 and 101' from the lower coil connection of the relay MD, via contact 88, to position 1 of bank C, to wiper C' to ground 30. This completes the lock-in circuit for relay MD after detector contacts 101 or 101' open and break the detector circuit through line 85.

The relay MD closes its contact 89, which completes a circuit from ground 30 through line 93, closed contacts 90/91 of relay YB, to closed contacts 89, line 55, position 1 of Bank E, through wiper contact E', line, 64, resistors 63 and 62 to point 61, the direct current minus terminal. The completion of this circuit changes the potential at point 65 and 65', where grids 23 and 33 are connected to the circuit as previously described, from approximately —45 volts to —14 volts for example and permits the tubes 25 and 35 to pass current.

Both timing capacitors 49 and 50 may be charged at this time. If this is so, both tubes will fire but this is of no consequence at this time since it is only necessary for one of the tubes to pass current.

If one of the timing capacitors is fully charged, it will permit its respective tube to fire.

If neither timing capacitor is fully charged, both timing capacitors will continue to charge until the charge on one of the timing capacitors and the potential on the plate of the tube in the respective circuit reach the breakdown potential for conduction between the plate and cathode as controlled by the grid bias.

At this point the tube in the respective timing circuit will pass current. The circuit elements of the several timing circuits are so selected for their value that the timing capacitor 50 will become fully charged almost immediately through certain circuits as selected by certain positions of the rotary stepping switch, while the elements in other circuits, as selected through the rotary stepping switch are so selected so as to allow the timing capacitor 50 to become fully charged after a time interval, all of which shall become apparent hereinafter.

The timing circuit, of which capacitor 49 is a part, is the maximum timing circuit. The capacitor may be charged from the direct current power 31 through the resistor 132, part of 133, tap 37, resistor 41, adjustable resistor 42, tap 56, and through contact 58 if it is closed, as previously described. If contact 58 is open, the charging circuit proceeds from tap 56 through resistor 57, lines 59 and 60 to capacitor 49. Tap 56 is adjustable and may be pre-set to the desired maximum time interval. When the tube 35 in the maximum timing circuit is conductive, relay BS is energized by a circuit that can be traced from capacitor 49, line 60, the coil of relay BS, to plate 34 of tube 35, cathode 32, line 154, point 29', to ground 30, which is connected to the ground side of capacitor 49 via line 93, line 122', point 122, and line 121.

The circuit operating the relay AS, upon conduction of tube 25, may be traced from capacitor 50 through line 152, the coil of relay AS, the plate 24 of tube 25, cathode 22, point 29, resistor 28, point 29' to ground 30, which is then connected to the ground side of capacitor 50 via line 93, line 122' and point 122.

The low voltage alternating circuit input 21 applies a potential on the cathode 22 at point 29, on the order of a few volts, via the voltage divider action of the circuit from alternating current input 21, resistor 26, line 27, through point 29, resistor 28, point 29' to ground 30. The potential applied to the cathode 22 is alternately a negative and positive potential with respect to ground, as the current alternates.

When the potential on the cathode is positive the grid bias on grid 23 is increased, as the potential applied to the grid 23 is a fixed negative potential. This increases the breakdown potential of the tube 25. When the potential applied to cathode 22 alternates to negative the grid bias is reduced and decreases the breakdown potential of the tube 25. This condition causes the tube 25 to fire sharply and aids the rapid advancement of the rotary stepping switch from position 1 through position 3.

In positions 4 through 11, this alternating potential applied to the cathode 22 is removed through bank D of the rotary stepping switch by grounding line 27 through bank D and line 95.

The flow of current through the coil of relay AS when tube 25 conducts, energizes the relay and it closes its contacts 94. Contacts 94 complete an energizing circuit for motor magnet MM from alternating current input 21 through the coil of motor magnet MM, contacts 94, line 95 to ground 30. The motor magnet MM thus energized closes its contacts 52 and 54 of the discharge circuits and both timing capacitors 49 and 50 discharge through resistors 51 and 53 respectively through contacts 52 and 54.

This stops the flow of current through whichever of the tubes has been conducting. Thus by cutting off conduction in tube 25, the relay AS is deenergized and releases contact 94 thereby opening the contacts and breaking the energizing circuit for motor magnet MM.

When the motor magnet was energized, it notched the ratchet gear on the stepping switch as previously explained and now, upon deenergization, the motor magnet MM advances the wiper contacts on the rotary stepping switch from one position to the next on all banks.

The contacts 52 and 54 are opened as motor magnet MM is deenergized, thereby breaking the timing capacitor discharge circuits and both timing capacitors begin to charge again.

Bank C, position 1 completes the minor detector circuit between ground 30 and contacts 88 to keey relay MD energized and maintains the same circuit in all positions except position 7.

It will be noted that when the bank C is in position 7 the contact to ground 30 is not made through the bank and therefore the circuit is broken. The contacts 88 then break and although the circuit could be completed through positions 8, 9, 10 and 11 of bank C the circuit will not be completed in absence of the completion of a circuit shunting open contacts 88 by a new call.

Bank D, position 1 is not connected in a circuit. Bank E, position 1 completes a circuit as previously described. Bank F, position 1 is part of one of the timing circuits.

In position 1 as assumed for the minor movement controller with the bias of the tubes 25 and 35 reduced by the action of contact 89 of relay MD in response to a minor movement traffic call, it will be assumed that relay AS has been operated and motor magnet MM operated and released so that the wiper contacts on the rotary stepping switch are advanced, as heretofore described, to position 2 of each bank of the rotary stepping switch.

Position 2 of bank A completes a circuit between ground 30 and contact 70 of relay PG. The completion of this circuit through line 215, terminal T15 in the parent controller, line 215' in the minor movement controller, contact 70 of relay PG, position 2 of bank A, wiper A', to line 30 puts in a call to the parent controller for phase B in the cycle of the parent controller.

Position 2 of bank D is connected to position 3 of bank D, both positions being connected to position 4 of bank A via line 159.

Line 160 connects line 159 to contact 161 of relay YB, which contact is connected to the ground side of the coil of relay GR via line 164.

Position 2 of bank E changes the grid bias circuit but maintains a connection between ground 30 and line 64. This circuit provides a direct connection to ground in positions 2, 3, 6, 7, 8, 9, 10 and 11 of bank E to provide an operating bias. Positions 4 and 5 shall be discussed hereinafter.

Position 2 of bank F maintains a circuit similar to that of position 1 of bank F. Direct current power 31 follows a circuit through resistor 150, position 2 of bank F, wiper contact F', line 151, line 152 to capacitor 50. The circuit to ground 30 is as previously described. When timing capacitor 50 is charged so that the charge reaches the breakdown potential of the tube 25, the tube 25 passes current. This energizes relay AS and closes contact 94, causing motor magnet MM to advance the wiper contacts to the next position as previously described.

When the wiper contacts move from position 2 to position 3 the call, through position 2 of bank A, to the parent controller for phase B is stopped by opening the call circuit. With the wiper contacts now in position 3 of the rotary stepping switch the minor movement controller is held in this position so long as relay PG is energized. This is because relay PG holds its contact 96 open and prevents completion of the timing circuit through position 3 of bank F.

When the phase A major green period terminates in position 6', the parent controller causes its cam shaft to advance to position 1' in a manner previously described and opens cam contact C9, which breaks the circuit previously traced from the alternating current input 20', in the parent controller, via lines 211, 211' to relay PG and signal 201. This broken circuit causes relay PG to be deenergized and also extinguishes the green signal 201.

Cam contact C21 is now closed to complete a circuit from alternating current input 20', in the parent controller through to lines 210, terminal T10, line 210' to yellow signal 209 to illuminate the yellow signal of phase A major. When relay PG became deenergized the contacts 96 were released and closed completing the timing circuit to charge capacitor 50 from direct current power 31 through resistor 150, contact 96, position 3 of bank F, wiper F', line 151, line 152 to timing capacitor 50. Capacitor 50 is connected to ground as previously described.

When the PG relay became deenergized contact 71 of PG relay was closed and while the timing capacitor 50 was charging, a call for phase A was sent to the parent controller through the completed circuit from ground 30 to wiper contact A', position 3 of bank A, contact 71, to line 214', terminal T14, to line 214 in the parent controller to cause the parent controller to return to phase A. This call went into the parent controller while the parent controller was in the clearance interval of phase A major yellow. This call circuit is broken when the wiper contacts are advanced to position 4.

When the charge on timing capacitor 50 reaches the breakdown potential of the tube 25 as aforesaid, the tube 25 passes current and relay AS and motor magnet MM are operated and released as aforesaid, and the wiper contacts are advanced to position 4.

The timing capacitor 50 begins to charge from the direct current power 31 via the resistor 107 through position 4 of bank F, wiper F', line 151, line 152 to capacitor 50. The tubes 25 and 35 are prevented from passing current at this time even though the timing capacitors may become fully charged. This is because the operating grid bias circuit through wiper E' to position 4 of the bank E is open, as the circuit now contains contact 91/92 of relay YB which is open.

Position 4 of bank A is connected to positions 2 and 3 of bank D as previously described and to the ground side of relay GR through contact 161 of relay YB. When relay YB is energized and closes its contact 161, as will be hereinafter described, position 4 of bank A supplies a ground connection for relay GR.

At the termination of the time interval for the yellow signal 209 of phase A major, the parent controller advances its cam shaft from position 1' to position 2' as previously described and opens cam contact C21 in the parent controller extinguishing the yellow signal 209, and closes cam contact C22 which completes a circuit from the alternating current input 20', in the parent controller, through cam contact C22, lines 213, 213' through relay PR, to ground 30. The relay PR becomes energized and closes its contacts 98/99. This completes a circuit from the alternating current input 20 in the minor movement controller through contacts 98/99, line 100, to red signal 202, thus illuminating the signal 202 during phase B of the cycle. At the same time the parent controller closes cam contacts C20 to illuminate green signal 301 as shown in Fig. 3 and explained heretofore.

The relay PR also closes its contact 102 which completes a circuit from the alternating current input 20 to line 80, to red signal 205. This circuit parallels the circuit already formed by closed contacts 76/77 to the red signal 205.

As the red signal 202 is illuminated and the green signal 301 of phase B is illuminated, the phase B intervals are timed by the parent controller as previously explained. At the termination of the time interval of the green signal for phase B, the parent controller advances to position 4' and the phase B green signals, shown in Fig. 1 as 301 and 301' will be extinguished and the yellow signal of phase B shown in Fig. 1 as 302 and 302' will be illuminated.

When the yellow signal of phase B is illuminated by the parent controller the cam contact C10 in the parent controller is closed thereby completing a circuit from the alternating current input 20', through cam contact C10, line L5, shown in Fig. 3, to lines 212, 212' to relay YB in the minor movement controller, to ground 30, thus energizing relay YB. The relay YB closes its contacts 91/92, which completes the operating grid bias circuit to ground 30 through position 4 of bank E and reduces the grid bias on the tubes 25 and 35 in the timing circuit permitting them to pass current.

Assuming that timing capacitor 50 became fully charged as the minor movement controller waited out the phase B green periods the tube 25 passes current because the bias is reduced. Relay AS is energized by the current flow in the timing circuit. The actions and reactions occur as previously described and the wiper contacts are advanced to position 5 of the rotary stepping switch. It will be noted that the timing circuit is complete, from the direct current input 31 through resistor 107 and positions 4 and 5 of bank F and on to the timing capacitor 50 as previously described.

While the minor movement controller was in position 4, the bank D completed a circuit to connect the cathode 22 directly to ground 30 through lines 27 and 95. The low voltage alternating current input 21 is also grounded through bank D and no longer applies a potential to the cathode 22. This circuit through bank D will remain complete in positions 4, 5, 6, 7, 8, 9, 10 and 11.

Position 4 of bank A is connected to the ground side of relay GR as previously explained. When the wiper contact A' moves to position 5 a circuit is completed between ground 30 and relay GR to the alternating current input 20. This circuit is also maintained in positions 6, 7 and 8 of bank A. When relay GR is thus energized it opens its contact 72 which will later prevent the green signal 201 from being illuminated when the parent controller continues in its cycle and moves into its phase A position 5'. It should be noted that at the present time the parent controller is in phase B, yellow position 4' with the yellow signal 302 illuminated and the minor movement controller is now in position 5 having advanced, as previously described.

Relay GR opens its contacts 76/77 which break a circuit from the alternating current input 20 and line 79 to line 80. This would extinguish the red signal 205, except that the contact 102 is held closed by relay PR and a parallel circuit from line 20 to line 80 and the red signal 205 is completed to keep the signal illuminated.

It may be noted that when relay GR was deenergized contacts 82/83 were closed to complete the circuit from alternating current input 20 through contact 82/83 to the green signal 206. Now as relay GR is energized, contacts 82/83 are opened breaking the circuit and extinguishing signal 206, and contacts 83/84 of releay GR are also closed. Contact 103 of relay YB also is closed and a circuit is complete from the alternating current input 20 through contact 83/84, contact 103 to yellow signal 207. Indicator lamp 67 is in parallel with signal 207 and is illuminated.

Signals 206, 207 and 208 shall be further discussed hereinafter as the signals appear in Fig. 4 but do not appear in Figs. 5, 6 and 7.

Contact 58 of relay GR is closed as relay GR is energized which permits resistor 57 to be by-passed by the current that is charging timing capacitor 49.

The relay GR opened its contact 73/74 and would have broken the circuit between lines 219 and 216 in the parent controller had it not been for the action of relay YB that closed its contact 105 and shunted the open contact 73/74. Closed contact 105 maintains a circuit from line 219 to line 216, thus completing the circuit from the alternating current input 20' in the parent controller through lines 219, 219', contact 105 to lines 216', 216, line L10 to transformer XFR in the parent controller, as shown in Fig. 3 to maintain the timing circuit in the parent controller. The timing capacitor 50 charges through resistor 107 and position 5 of bank F, wiper F' and through the remaining circuit as previously described for position 4 of bank F, but the tube 25 cannot pass current even though the capacitor 50 may become fully charged since the grid bias circuit through position 5 of bank E is opened by open contact 90/91 of relay YB. At the termination of the yellow signal period of phase B, as timed by the parent controller, the parent controller moves from its position 4' to its position 5', the phase A major green position. The parent controller now opens cam contacts C22 and C10, thereby deenergizing relays PR and YB and closes cam contact C9 to energize relay PG.

Deenergization of relay YB opens contacts 91/92 and closes contacts 90/91 thereby completing the operating grid bias circuit and reducing the bias on the grids 23 and 33 of the tubes 25 and 35, permitting the tubes to pass current when the respective capacitors become sufficiently charged. As the tube 25 becomes conductive and passes current for example, relay AS is energized and, as previously described the wiper contacts are advanced to the next position 6.

The parent controller has moved into its position 5', as aforesaid and the minor movement controller is now in its position 6, the phase A minor initial period.

With the parent controller in its position 5' the PR relay became deenergized and contact 98/99 opened. This would have extinguished red signal 202 except that contact 77/78 of relay GR is closed as previously explained, to complete a circuit from the alternating current input 20, contact 77/78, line 81, line 100 to red signal 202 to keep the red signal illuminated.

Relay YB was also deenergized and opened contact 108 as relay PR opened contact 102. This resulted in a break in the circuit from the alternating current input 20 to line 80 to red signal 205 and extinguished red signal 205.

Contacts 97/98 of relay PR and contact 109 of relay YB close, thereby completing a circuit from the alternating current input 20 through contacts 97/98 of relay PR, contacts 109 of relay YB and 104 of relay GR to point 115, line 110, contacts 111/112 of relay YR to green signal 203. This illuminated green signal 203, the phase A minor signal, and indicator lamp 69 in shunt with the green signal 203.

When relay YB became deenergized contact 105 opened to interrupt the circuit between lines 219 and 216 causing the timing in the parent controller to stop. With its timing power circuit open the parent controller will remain in the same position it is presently in until the timing power is restored and the parent controller again proceeds to time its position as described in reference to Fig. 3.

When the parent controller energized relay PG the green signal 201 would have been illuminated, however the relay GR opened contact 72 to open the circuit and keep the green signal 201 extinguished. The relay YB opened contact 103 to break the illuminating circuit to extinguish the yellow signal 207 and its indicator lamp 67.

The red signal 208 is illumiated from the alternating current input 20 through contacts 97/98, 109 and 104 to point 115, line 114 to red signal 208.

As the minor movement controller advanced into position 6 it caused the timing in the parent controller to stop, kept the green signal 201 from being illuminated, maintained the red signals 202 and 208 illuminated and caused green signal 203 to be illuminated, thus taking over control of the intersection. The red signal 303 of the phase B signals is illuminated by the parent controller.

The minor movement controller is now in the initial interval of phase A minor period. The timing capacitor 50 now charges slowly from direct current power 31 through resistor 132, part of resistor 133, tap 38, through resistors 43 and 44 which control the current flow through tap 36, to position 6 of bank F, through wiper F', line 151, line 152 to capacitor 50. The amount of time now necessary to charge capacitor 50 is predetermined and nonextendible. When the charge on capacitor 50 reaches the breakdown potential of tube 25, the tube 25 passes current and relay AS is energized and the wiper contacts are advanced to the next position as explained heretofore. The minor movement controller is now in position 7.

In position 7 of bank C the lock-in circuit holding the MD relay is broken; the relay MD is thus deenergized and indicator lamp 66 is extinguished and both contacts 88 and 89 are opened. Contacts 117/118 of relay MD are opened as contacts 116/117 of relay MD are closed.

The timing capacitor 50 starts to charge from the direct current power 31 through resistor 132 and part of 133, tap 39, resistors 45 and 46, tap 119, contacts 116/117, position 7 of bank F, wiper F', line 151, line 152 to capacitor 50.

The time necessary to charge the capacitor 50 is predetermined by the adjustment of tap 119 and the interval of time is called the vehicle interval. This interval of time is extendible. If, while the vehicle interval is being timed by the charging of timing capacitor 50, a vehicle crosses one of the minor detectors and closes contacts 101 or 101', the minor detector relay circuit will be complete from ground 30, through the contacts 101 or 101', line 85 to relay MD, to the alternating current input 21. The relay MD will become energized and will close contacts 117/118 and open 116/117.

Indicator lamp 66 will also be illuminated during the time the MD relay is energized.

When contacts 117/118 close, a circuit is complete from the ground side of capacitor 50 to point 122, line 121, resistor 120, contacts 117/118, to position 7 of bank F, wiper F′, line 151, line 152 to the charging side of capacitor 50. This completes a discharge circuit for capacitor 50. When the vehicle leaves the minor detector the contacts 101 or 101′ reopen and break the minor detector circuit. The relay MD becomes deenergized and the indicator lamp 66 is extinguished.

Relay MD releases its contacts 117/118 and the contacts open as contacts 116/117 close, completing again the charging circuit, and breaking the discharge circuit previously described, for capacitor 50.

As additional vehicles cross one of the detectors in one of the left turn lanes the above described action will be repeated so long as the minor movement controller is in the vehicle interval position, up to the maximum time limit as determined by capacitor 49, relay BS and adjusting resistance 42.

When the motor magnet MM advanced the wiper contacts of the minor movement controller from position 6 to position 7, the timing capacitors 49 and 50, after having been discharged both began to recharge from substantially zero charge on both capacitors with respect to ground. Capacitor 50 began to charge through the circuit as previously described, to time the vehicle interval, while capacitor 49 began to charge from the direct current power 31, resistors 132 and part of 133, tap 37, resistors 41 and 42, tap 56, through contact 58, line 59, line 60 to capacitor 49, to time the maximum interval. The maximum interval is the non-extendible, maximum time period preset by adjusting tap 56 on resistor 42, that the minor movement controller will be allowed to remain in position 7 before relay BS becomes energized to effect an advance of the rotary stepping switch to the next position.

The vehicle interval, which is extendible as previously described and the maximum interval now are both being timed.

Subsequently due to a gap of sufficient size between actuations by the left turn lane traffice the capacitor 50 will become charged sufficiently to fire tube 25, or, in the absence of such a gap, the maximum timing capacitor 49 will become charged sufficiently to fire tube 35, and either tube 25 or tube 35 will become conducting, whereupon either relay AS or BS, as the case may be will become energized to cause the advance from position 7.

Assuming that timing capacitor 50 is successively discharged by repeated actuations of the detectors 101 or 101′, by vehicles crossing one or the other of the detectors, the timing capacitor 49 becomes sufficiently charged and tube 35 is permitted to pass current. The relay BS is energized and closes its contacts 123 and 124. An energizing circuit for the motor magnet MM is completed from ground 30, through line 95, contact 123 to the motor magnet MM, to the alternating current input 21. The BS relay also closes its contact 124 to complete a circuit for energizing relay MD. The relay MD closes its contact 88 and completes a shunting circuit through contact 125 of the motor magnet MM. The motor magnet MM now becomes deenergized, as previously explained and advances the wiper contacts to the next position 8, thus terminating the vehicle interval period of phase A minor.

The motor magnet MM will hold contact 125 closed, until wiper C′ makes contact with position 8 in bank C, as the stepping switch is advanced to position 8. This action completes a circuit for the minor detector relay MD which will act to leave a call in the minor movement controller and to return the parent controller in its cycle so that the minor movement phase will again be inserted into the cycle of the parent controller and clear any vehicles that may not have cleared the intersection because of lack of time remaining in the phase A minor period.

The minor movement controller, now in position 8 is in the clearance interval period of phase A minor. Position 8 of bank B, completes an energizing circuit for relay YR from ground 30 through wiper contact B′, position 8 of bank B, the relay YR to the alternating current input 20. The relay YR opens its contacts 111/112 and breaks the circuit illuminating the green signal 203, thereby extinguishing green signal 203, the phase A minor signal, and its indicator lamp 69.

Contacts 112/113 of relay YR are closed to complete a circuit from the alternating current input 20 through contacts 97/98 of relay PR, contact 109 of relay YB, contact 104 of relay GR to point 115, line 110, to contacts 112/113 of relay YR, to yellow signal 204, thereby illuminating the yellow signal, the clearance signal of phase A minor. An indicator lamp 68 is also illuminated at this time in parallel.

The timing capacitor 50 begins to charge from the D.C. power 31 through resistor 132 and part of resistor 133 to tap 40, resistor 47 and adjustable resistor 48, tap 126, to position 8 of bank F, wiper contact F′, line 151, line 152 to capacitor 50.

The clearance interval is now timed and at the end of the interval, when the capacitor 50 is sufficiently charged, the tube 25 passes current and, as previously described, the wiper contacts are advanced to the next position of the rotary stepping switch.

The rotary stepping switch is now in position 9 and phase A minor has terminated. The relay GR is deenergized as its energizing circuit is no longer completed through bank A.

Contact 72 is closed and green signal 201 of the phase A major signals is illuminated from alternating current input 20′, through cam contact C9, lines 211, 211′, contact 72 to green signal 201.

Contact 77/78 is opened and breaks the circuit between alternating current input 20 and line 81 to line 100 to extinguish the red signal 202 of the phase A major signals.

Contact 76/77 is closed completing the circuit between alternating current input 20 and line 79 to line 80 to red signal 205 of the phase A minor signals thereby illuminating red signal 205.

Contact 82/83 is closed and completes a circuit between alternating current input 20 and green signal 206, thus illuminating this signal. Green signal 203 was previously extinguished by the opening of contact 111/112 by relay YR as it was energized.

Now relay GR releases and opens contact 104, which breaks the circuits as previously described, and causes yellow signal 204, and its indicator lamp 68, and red signal 208 to be extinguished. Contact 73/74 of relay GR is released and closes thus completing the circuit from alternating current input 20′, to lines 219—219′, through contact 73/74, lines 216′, 216, to line L10 to transformer XFR, as shown in Fig. 3. With this circuit complete the parent controller resumes its timing and once again controls the intersection.

Positions 9, 10 and 11 of bank C maintain the connection to ground 30 that position 8 had made. This assures that should a call be received by the minor movement controller while it is in its position 8, 9, 10 or 11 the minor detector circuit will be completed through the lock-in contact as previously explained.

It was heretofore assumed that the green signal period of phase A minor was terminated by the maximum interval timing circuit relay BS, and that the relay MD became energized by the action of the BS relay as hereindescribed. Since the MD relay has a lock-in circuit, the minor detector circuit is maintained in positions 8, 9, 10 and 11 of bank C. Positions 9, 10 and 11 of the minor movement controller are, in this type of operation, skipping steps or absorbing steps and have no significant effect on the minor movement controller as it advances rapidly from position 9 to 10 to 11 and into 1.

The timing capacitor 50 charges rapidly from the direct current power 31 through resistor 107, switch 147/148, position 9 of bank F, wiper F' and into the previously described circuit. The wiper contacts are advanced in due course of the operation of the circuit elements, as previously described. The process is repeated through positions 10 and 11, on bank F independent of switch 147/148, and the wiper contacts leave the rotary stepping switch contacts, from position 11 and the next succeeding set of wipers make contact with position 1 of each bank of the rotary stepping switch.

As this operation has been described the minor movement controller is now in position 1 with a call on it, to cause repetition of the cycle of operation, as a result of termination of the phase A minor green period in position 7 by the maximum timing circuit.

However, now considering again position 7 of the minor movement controller, the extendible vehicle interval, let it be assumed that there were no actuations on the minor detectors or that there was a gap of sufficient time between actuations of the detectors 101 or 101' to allow the capacitor 50 to charge sufficiently so that the tube 25 was permitted to pass current so that the vehicle interval period would be terminated by energization of relay AS to advance the rotary stepping switch to position 8.

If the green signal period of phase A minor terminated by energization of relay AS the advancement of the rotary stepping switch would be similar to any advancement as previously described, via relay AS. This advancement would be made without energizing the MD relay so that if no further actuations of the detectors 101 or 101' were received the MD relay would not be energized and although the steps from positions 7 through 11 would be the same as previously described, the minor movement controller would reach position 1 without the relay MD being energized and the minor movement controller would rest in position 1 as the parent controller continued to serve whatever the demands of traffic may be on phase B and phase A major. The minor movement controller would now be in the same inactive or resting condition, with respect to the parent controller as originally described, until a call is received by actuation of one of the minor movement detectors.

However, if the green signal period ended via the AS relay and the MD relay was not energized at the time of the advancement of the rotary stepping switch from position 7 to 8, a call could be received through one of the detectors 101 or 101' to energize and lock-in relay MD at any time during the time the minor movement controller is advancing through positions 8 through 11.

In describing the several signal circuits above the circuits have been traced only to one side of the signals for simplicity in most cases, although it will be understood that the other sides of the signals are all returned to grounded power at line 30 or line L2 as the case may be as shown in the drawings.

The signals 206, 207 and 208 will now be explained. It has been described above, relative to one minor movement controller, where and how in the cycle these signals are illuminated and extinguished. The signals appear in Fig. 4 as being associated with the minor movement controller.

This set of signals is not utilized in the description of the traffic control system herein described due to the relative simplicity of the intersection illustrated in Fig. 1. However, the set of inverted signals may be used at a more complex intersection, for example.

These signals are commonly known as inverted signals and, if used, would be inverted phase A minor signals, either inverted phase A minor north or inverted phase A minor south, for example, according to which phase of traffic the set of signals would be associated with.

The inverted signals of the associated phase would remain green at all times except just before the phase A minor period, with which it would be associated, would be about to begin, when a yellow clearance signal, 207, would be illuminated and a green signal, 206, would be extinguished. During the associated phase A minor period a red signal 208 would be illuminated.

Each minor movement controller would control one set of inverted signals associated with the particular minor phase of the minor movement controller.

The inverted signals may be used, for example, to allow a particular desired flow of traffic to continue at all times except when the phase A minor traffic, with which the inverted signals would be associated, is flowing, as in the case of a particular flow of traffic which would conflict only with its associated phase A minor traffic.

Fig. 3*a* illustrates an alternate method or arrangement for external control of the timing of the parent controller, as during part of the operation of the minor movement controller as previously described.

Fig. 3*a* in effect represents a modification of a part of Fig. 3 such that with the broken line box in the lower right corner of Fig. 3 modified as shown in Fig. 3*a*, the parent controller of Fig. 3 with the Fig. 3*a* modification, has its timing power connection internal and controlled by a relay TR which in turn is externally controlled by the minor movement controller instead of having such power connection itself extend externally through the minor movement controller. The modification also inverts the action of the means for stopping timing, by having the relay TR energized to interrupt timing power, so that the external control circuit can operate this relay and thus be closed only to stop timing instead of being opened only to stop timing.

Fig. 3*a* thus illustrates a modification of the part of Fig. 3 enclosed in the broken line box in the lower right corner. Fig. 3*a* is presented with switch SW11 closed, relay TR deenergized and contact TR1 of relay TR closed completing a circuit from input 20' to line L10 via contact TR1. In Fig. 3*a*, line 217 is employed for external control instead of line 216 of Fig. 3.

As explained above, the method of control of the timing used by the connection as shown in Fig. 3 requires certain relays in the minor movement controller to be energized to open their contacts to open the circuit between input 20', which is connected to minor movement controller via line 219, and line 216 which is connected to the transformer XFR via line L10. In such case, the contacts in the controlled circuit through the minor movement controller would be closed except to stop timing.

When the alternate method, as shown in Fig. 3*a*, for control of the timing in the parent controller is used in lieu of the method illustrated in Fig. 3 shown within the broken line area, line 217 serves as an input line for external control of relay TR by connection of line 217 to line 219 to energize relay TR and by opening such connection to deenergize relay TR, through contacts in the minor movement controller.

The preferred form of the minor movement controller provides for both forms of timing control so that it can serve both types of parent controllers.

Thus when this alternate method of stop timing control as shown in Fig. 3*a* is used, the switch SW11 in Fig. 3*a* would be closed and the alternating current input would extend from line 20' through switch SW11 and contact TR1, to line L10 to transformer XFR. The line 219 would be used as part of a circuit to energize relay TR to stop timing by opening contact TR1. The relay TR energizing circuit would be controlled by contact 106 of relay YB and contact 74/75 of relay GR in the minor movement controller.

In position 5 of the minor movement controller both relay YB and GR become energized. Relay GR closed its contact 74/75 which would have completed the TR energizing circuit but relay YB opened its contact 106 to keep the circuit open. When, in position 6 relay YB became deenergized the contact 106 closed and relay TR would be energized from the alternating current input 20' through lines 219, 219', contact 74/75, contact 106, lines 217'—217, the coil of the TR relay to ground. The TR relay thus energized, would open its contacts TR1 and open the power line between the alternating current input 20' and the transformer XFR. This would stop the timing in the parent controller as did the previously described method.

The TR relay remains energized so long as the relay GR remains energized and relay YB remains deenergized. As relay GR, in position 9 becomes deenergized, the contact 74/75 opens to open the energizing circuit for relay TR. With TR deenergized the contact TR1 closes thereby completing the circuit from the alternating current input 20' through switch SW11, contact TR1, line L10 to transformer XFR to again resume the timing in the parent controller.

During the minor phase of phase A, the minor movement controller assumed control of the intersection and halted the timing of the parent controller. At the termination of the phase A minor the timing of the parent controller was resumed. This effectively extended the time of the entire cycle of the parent controller for the length of time of the minor phase.

It may be desired to insert the minor phase into the cycle without extending the time of the entire cycle. This may be accomplished by allowing the timing of the parent controller to continue during the minor phase, by disconnecting the timing control of the minor movement controller over the parent controller and closing switch SW11, in Fig. 3 so that the alternating current input 20' is connected directly to the transformer XFR through line L10.

The "yield control" line 218 which is connected via terminal T18, line 218', contact 170 of relay YC, line 171 to ground when the contact 170 is closed by energization of relay YC has heretofore been unmentioned because it was not a necessary connection for the operation as previously described. The relay YC is employed only when the "yield control" is used to control the parent controller.

The relay YC is energized from the AC input 20, through the coil of relay YC, line 218" to ground through positions 1–5 and 10 and 11 of bank B. When relay YC is thus deenergized its contact 170 is open and the ground connection through the circuit as previously described is not completed to line 218 which line is connected to lines Q and O in the parent controller in Fig. 3. The switch SW10, shown open in Fig. 3, must now be open to break the alternate ground connection to line 218.

This yield connection, without the timing control, allows the parent controller to continue timing (as switch SW11, shown open would be closed when the "yield control" is used) when the minor movement controller takes over control during the phase A minor period. The parent controller will advance from its position 5' to its position 6' during the phase A minor period.

Because of the lack of a ground connection to lines Q and O the parent controller cannot advance out of its position 6' as previously explained in reference to Fig. 3. Therefore, during the phase A minor period the parent controller will advance to its position 6' and hold in that position during any of the remaining time of the phase A minor period of positions 6, 7 and 8 and must also remain in its position 6' during the timed interval of position 9 of the minor movement controller.

Switch 149, which is shown closed in Fig. 4, located near position 11 of bank B, would be opened so that the relay YC would remain deenergized in position 9.

Switch 147/148, shown closed in Fig. 4, would be open and switch 146/147, shown open in Fig. 4, would be closed to permit an interval to be timed in position 9 from the direct current supply 31, through resistor 132, part of resistor 133, tap 129, resistor 130, adjustable resistor 131, tap 145, switch 146/147, position 9 of bank F, wiper F', lines 151 and 152 to capacitor 50.

Normally the time of position 5' and position 6' of the parent controller as timed by the parent controller will exceed the time of the phase A minor and the interval timed in position 9 of the minor movement controller by the minor movement controller. Should the time of the phase A minor and the intervals as timed in position 9 of the minor movement controller exceed the time of the intervals timed in positions 5' and 6' of the parent controller, the cycle of the parent controller will be extended but only for the shorter time period that the intervals timed in positions 6 to 9 of the minor movement controller exceeds the time of the intervals timed in positions 5' and 6' of the parent controller. When the capacitor 50 in Fig. 4 becomes sufficiently charged the rotary stepping switch would be advanced to the next position as previously described.

The energizing circuit for relay YC would again be complete and energized relay YC would close its contact 170 to complete a ground connection as previously described, to line 218 and lines Q and O to permit the parent controller to advance to its next position 1' when it is ready to do so.

The switch 149 and double switch 146/147, 147/148 are manual switches and ganged by line 165. Thus with switch 146/147 closed and 149 opened, the timing of the parent controller in position 6' is controlled to assure a minimum phase A major green period as set by tap 145 on adjustable resistor 131.

The cycle of the parent controller may be extended but it will not be extended for the entire time of the phase A minor period. Normally the time of position 5' and position 6' of the parent controller as timed by the parent controller will exceed the time of the phase A minor period and the interval timed in position 9 of the minor movement controller by the minor movement controller.

The position 9 of the minor movement controller would be timed from the direct current supply 31 through resistor 132, part of resistor 133, tap 129, resistor 130, adjustable resistor 131, tap 145, switch 146/147, position 9 of bank F, wiper F', lines 151 and 152 to capacitor 50.

This method of operation is optional with the user and the device may be used either extending or not extending the time of the entire cycle, as the sequence of traffic control may require for control of traffic at the intersection at which the device is used.

It will be noted that the parent controller as presented in Fig. 3 is adapted so that the "yield control" may be used when the minor movement controller is associated with phase A only.

Should it be desired to associate a minor movement controller with phase B in lieu of phase A, the cam controlling cam contact C8 must be rotated in its position on the cam shaft so that cam contact C8 would open only in position 3' instead of position 6' and the connection of contact D2 to its left to line O would be broken and contact D2 would be connected to its left ground to line L2. The line to the left of contact E2 would be broken at its junction on ground line L2 and would be connected to line 218 via line O.

This modification would permit the "yield control" to be used with a minor movement controller on phase B in lieu of phase A.

It will be appreciated that the relay YC and the circuit that it controls via its contact 170, as illustrated in Fig. 4, is a slight modification of the minor movement controller of the aforesaid copending application and the relay YC may be either internal or external to the minor movement controller.

Another optional feature is the use of a series of signals of which the green signal shall be an overlap signal. This green signal would be the normal phase A green signal that would overlap the green and yellow signals of the phase A minor signals, when they are shown and the green signal of phase A major. The green signal of phase A could be used to control for example traffic that would be considered noninterfering lanes during the phase A minor period and the phase A major period but would be considered interfering traffic during the phase B period. The green signal of the phase A signals would be connected to terminal T11 so that the green signal will be illuminated at all times during the phase A minor green and yellow period, when phase A minor is showing, and during the phase A major green period.

The yellow signal of this particular set of signals would be connected to line 210 to display the yellow signal when the yellow signal of phase A major is displayed.

The red signal of this set of signals would be connected to terminal T13 so that the red signal would be displayed during the phase B green and yellow signals only.

Let us now assume that the parent controller is about to terminate the green signal of phase B, with a call for phase A. Let us also assume that a call is received for the minor phase A via an actuation of one of the detectors in one of the left turn lanes of Street A.

Further assume that after the call for the minor phase A is received the minor movement controller advances from its rest position 1 into position 2. At this time the phase B green signal terminates and the phase B yellow clearance signal is illuminated. When the phase B yellow signal is illuminated the relay YB is energized through a circuit previously described.

Relay YB would close its contact 161 to complete an energizing circuit for relay GR from the alternating current input 20 through the coil of relay GR, line 164, contact 161 of relay YB, line 160, line 159 to position 2 of bank D through wiper contact D′ and line 95 to ground line 30.

With both relays YB and GR energized the yellow signal 207 of the inverted minor phase A would be illuminated and the green signal 206 of the inverted minor phase A would be extinguished as previously described.

The ground connection for relay GR would be maintained through position 3 of bank D similar to that circuit described through position 2 of bank D.

When the minor movement controller moves into position 4 of the rotary stepping switch the ground connection for relay GR would be completed from the ground side of the relay GR through line 164, contact 161 of relay YB, line 160, line 159 to position 4 of bank A, wiper contact A′ to ground line 30.

The action of the circuit just described will provide a yellow clearance signal in the inverted minor phase of adequate length when a call for the phase A minor is received just prior to the yellow clearance signal of phase B.

If the yellow clearance signal of phase B should be illuminated when the minor movement controller is in its position 3 or 4, the yellow signal of the inverted phase A minor signals will similarly be illuminated via the circuits previously described.

Although some of the control circuits interconnecting the two controllers as shown in Fig. 4, as in the case of the timing control lines 216 and 219 of the alternate 217 and 219 for example, bring power from the parent controller through contacts in the minor movement controller and back to the parent controller, it will be understood that where the two main sources of power on lines 20′—L2 in Fig. 3 and lines 20 and 30 in Fig. 4 are the same common source, then the line 219′ in the minor movement controller may be connected to line 20 in the minor movement controller instead of via line 219 to line 20′ in the parent controller and eliminate one interconnecting line.

It was previously noted that the "yield control" could only be used on phase A without additional modifications on the parent controller as presented in Fig. 3. Certain modifications were also described so that the yield control could be associated with phase B in lieu of phase A.

It should also be understood that additional modification of the circuit of the parent control presented in Fig. 3 would permit the use of the "yield control" when a minor movement controller is associated with each phase, one minor movement controller associated with phase A and one minor movement controller associated with phase B, for example. Such modification would include an additional cam contact, that may be called C8B, that is closed in all positions except 3′, and then its is open. Cam contact C8B would be connected to the line L4 extending from the left side of cam contact C8 between cam contact C8 and the junction of the line leading to relay BR. Line Q would be disconnected from the junction formed by line Q and the line from the left side of relay BR, and line Q would be connected to the heretofore unconnected side of cam contacts C8B, L8.

A line 218B would be connected between the parent controller and the second minor movement controller, here assumed to be associated with phase B. Line 218B would connect to the second minor movement controller, on phase B, in a similar manner as described for line 218, here assumed to be connected to the minor movement controller associated with phase A. A switch SW10B would be placed between line 218B and ground lead L2 which switch would be open when such "yield control" would be used to control the parent controller.

Line 218B would be connected to the line, L8, on the right side of cam contact C8, which line would be disconnected from the ground line at its terminal at ground line L2.

The connection between contact E2 and the ground lead via line L9 would be broken and the contact E2 would be connected instead to the line 218B through the line, L9.

With such modification of the parent controller here presented, the ground connection previously described through line Q, cam contact C8, when closed, to ground lead L2, would now be made through the rotary stepping switch of the minor movement controller when the minor movement controllers were either at rest or in any position other than positions 6, 7, 8 or 9.

Referring again to Fig. 3, it will be appreciated that by closure of the recall switches PA and PB the parent controller would accord right of way alternately to phase A and to phase B without the necessity of actuations of the vehicle detectors associated with the respective phases.

Such vehicle detectors, associated with phase A and associated with phase B may be disconnected from the parent controller upon such closure of both switches to illustrate non-actuated operation, for example.

The non-actuated cyclic operation of the parent controller may be performed when the parent controller is in independent operation or when used in conjunction with a minor movement controller.

It will also be appreciated that should the parent controller be used as a non-actuated traffic controller and a minor movement controller were associated with the parent controller in such condition, then the circuits completed in positions 2 and 3 of the minor movement controller to the parent controller may be disconnected as these circuits are no longer necessary to call the parent controller to a position in its cycle so that the minor movement controller may insert its minor phase into the cycle as the parent controller would return to such position automatically.

Although a three phase type of parent controller has not been illustrated herein, it is obvious, in view of the teachings above, that a minor movement controller may be associated with a three phase parent controller, in a manner similar to that set forth herein for a two phase controller. An example of a three phase controller is disclosed in U.S. Patent 2,100,831, issued on November 30, 1937 to John L. Barker.

Referring now to Fig. 5, a phase sequence chart is presented disclosing in particular the sequence of signals that would occur during two consecutive cycles of the traffic control system herein disclosed, using two minor movement controllers associated with one phase of a two phase cycle. Each cycle is divided into two principal phases, phase A and phase B. Phase A is further divided into phase A major and phase A minor, as is indicated across the top of the chart. The first cycle is presented with the phase A minor inserted into the cycle before the phase major while the second cycle is presented without the phase A minor. Each phase or division of a phase is subdivided into two periods as indicated by the term "Periods" at the left and further indicated by a small *p* following a number from 11 to 20 inclusive.

Along the left edge of the chart is indicated the phase of traffic to which the signals to the right of the name are displayed.

The phase A major north signals would be displayed to all traffic approaching the intersection, shown in Fig. 1, from the north along Street A, with the exception of the left turn traffic approaching from the north along Street A which would be the phase A minor north traffic. To the phase A minor north traffic would be displayed the phase A minor north signals.

The phase A major south signals would be displayed to all traffic approaching the intersection from the south along Street A with the exception of the left turn traffic approaching from the south along Street A which would be the phase A minor south traffic. To the phase A minor south traffic would be displayed the phase A minor south signals.

The phase B signals would be displayed to both east and west traffic along Street B.

The letters in the chart represent the color of the signals R for red, Y for yellow and G for green.

Reading across the chart in Fig. 5 from left to right one may read the particular phase of traffic to which the signals are displayed and the sequence of signals that would be displayed during two consecutive cycles with the phase A minor, both north and south, inserted into the first cycle and both phase A minor north and south signals omitted from the second cycle.

Reading from top to bottom one may read the phase of the cycle and the period of the phase and all the signals that are displayed during a particular period.

The signals illuminated during phase B period 11*p* and phase B period 17*p* are similar, as are phase B period 12*p*, and phase B period 18*p*.

The signals illuminated during phase A major period 15*p* and phase A major period 19*p* are the same, however it will be noted that phase A minor period 14*p*, which precedes phase A major period 15*p* differs from the period preceding phase A major period 19*p*. Phase A major period 16*p* and phase A major period 20*p* are similar in all respects.

The first cycle on the chart Fig. 5 would indicate that a call was received for both phase A minor north and phase A minor south while in the second cycle no call was received for either phase A minor south so that their right of way signal sequence is entirely omitted from the cycle. Therefore in the first cycle the phase A minor period 13*p* displays a green signal to the phase A minor south traffic and the phase A minor north traffic while the remaining phases of traffic receive a red signal. This is followed by period 14*p*, the clearance period of the phase A minor.

If there are no calls for either of the minor phases, the signals remain red for the phase A minor north and phase A minor south traffic, while the cycle continues without the insertion of a phase A minor green and yellow signals.

Fig. 6 is a phase sequence chart similar in form to Fig. 5, however only one cycle is presented. Again without any element of time being shown, Fig. 6 represents the sequence of signals shown to the minor phases of traffic during one cycle, however it is here assumed that only the phase A minor north was called for by traffic actuation. It should be assumed that there is no traffic at the time to call for the phase A minor south.

It will be noticed that the phase B periods 21*p* and 22*p* are similar to comparable phase B periods in Fig. 5. However, the phase A minor periods present a change from the phase A minor periods in Fig. 5. Referring also to Fig. 1 and Fig. 6 for clarity, when in the phase A minor period 23*p* the phase A minor north displays a green signal and the phase A minor south displays a red signal there is no conflicting traffic flow for the phase A major north traffic so that Fig. 6 illustrates a green signal for phase A major north traffic. This condition of non-conflicting traffic remains in phase A minor period 24*p* so that while the phase A minor north signal turns to a yellow, a green signal is still displayed to phase A major north traffic. During the phase A minor periods, since there had been no call prior to the phase A minor period for phase A minor south the phase A minor south signals remain red. The phase A major periods 25*p* and 26*p* are similar to the comparable periods of phase A major in Fig. 5.

It should be noted that there may be a call for the phase A minor south and no call for phase A minor north. Should this occur the phase A minor south would show green in period 23*p* and yellow in period 24*p* while the phase A minor north would display red signals for the two periods. Similarly the phase A major south would display green signals in periods 23*p* and 24*p* while the phase A major north signals would show red for the periods 23*p* and 24*p*.

It is worthy to note that a minor phase which is here associated with phase A may also be associated with phase B in lieu of phase A, or, may be associated with phase B in addition to being associated with phase A.

If a minor phase were associated with the phase B in lieu of its association with phase A the sequence chart would remain the same except that the letters A and B would be interchanged wherever they appear on the sequence chart.

Should, however, minor phase be associated with both phase A and phase B then the phase sequence chart would be a combination of that presented herein and the chart mentioned above where a minor phase would be associated with phase B.

Referring now to Fig. 7, a phase sequence chart is presented in the general form of the charts above except that element of time is employed in the phase A minor periods. Similar traffic phases are indicated at the left and similar signal phases are presented across the top covering one complete cycle. The phase B periods 31*p* and 32*p* are similar to the comparable periods of phase B in Figs. 5 and 6 while the phase A major periods 35*p* and 36*p* are similar to the comparable periods of phase A major in Figs. 5 and 6.

It will be noted that phase A minor is inserted into the cycle before phase A major, indicating a call had been received for one or both of the phase A minor movements. In this case Fig. 7, both phase A minor north and phase A minor south display green signals while other signals are red. However, the phase A minor north green signal continues to be illuminated over periods 33*pb* and 33*pc*, changing to yellow in period 34*p* while the phase A minor south signals change to yellow in period 33*pb* and to red in period 33*pc*. When the phase A minor south signals display a red signal (period 33*pc*) the phase A major north signal changes to green and holds green into period 35*p*.

This particular phase sequence chart in Fig. 7 is presented to illustrate one characteristic of the traffic control system in that one minor phase (phase A minor south for example) may terminate early, with respect to the other minor phase (phase A minor north for example). Thus when an early termination of one of the minor phases occurs, the other minor phase being extended, the right-of-way is given to the traffic movement then unopposed (phase A major north for example).

Since the minor movement controller has an extendible interval, as previously described, and each minor movement controller is actuated independently of the other one minor phase may be extended, in time, beyond the time of the other, or both may be extended to the maximum time respectively thereby effecting termination of the minor phases together. However, as pointed out, an early termination of one minor phase, relative to the other minor phase transfers the right-of-way to the non-opposed traffic movement offering a great degree of flexibility of traffic flow into and out of the controlled intersection.

Should the phase A minor north terminate early and the phase A minor south be extended, relative to each other, the phase A major south would then be the non-opposed traffic movement and right-of-way would be transferred to the phase A major south movement while the phase A major north movement is held by the red signal.

Referring to Fig. 8 a diagram, partly in block and partly in schematic form, is illustrated with a parent controller, represented by a box so marked, above two minor movement controllers MMN and MMS, each represented by a box.

The parent controller represented in Fig. 8 would be of a type of traffic controller commonly known as a volume density traffic controller. One such type of traffic controller is described and disclosed in my U.S. Patent 2,265,991, issued December 16, 1941, for example.

The minor movement controllers would be of the same nature as the controller described in Fig. 4 herein. The relays GR and G'R', appearing in the minor movement controller MMS and MMN respectively, represent the relay GR in the circuit diagram presented in Fig. 4. The contacts 401 and 401' represent vehicle detectors that appear in Fig. 1 and are associated with the phase A major traffic. Vehicle detector 401 is associated with the phase A major south traffic and vehicle detector 401' is associated with the phase A major north traffic.

The purpose of the circuit of Fig. 8 is to open the detector circuit during that period of time when only one of the phase A minor movements received the right of way, along with the adjacent non-conflicting phase A major traffic movement. With the detector circuit thus opened, the vehicle detector in the lane of the phase A major movement receiving the right of way during a phase A minor flow period is disconnected from the parent controller so that additional calls are not received by the parent controller as actuations cannot at that time pass through to such controller from the disconnected detector.

One effect of such additional calls if permitted on this type of traffic controller, as more fully described in my Patent 2,265,991 previously mentioned would be to predetermine a longer minimum green period for the next following phase, which in the present case would be phase A major. Since the flow of traffic continues on the part of phase A major adjacent to, and receiving the right-of-way with the one actuated minor movement of traffic, as assumed, it is unnecessary and undesirable to store such actuations to prolong the following phase A major green signal period for the opposite approach. Thus the circuit arrangement of Fig. 8 prevents such unnecessary actuations of the particular following phase A major period, by disconnecting detector 401 when controller MMS alone is in phase A minor south go and clearance periods and in the preceding parent controller clearance period, and by disconnecting detector 401' when the controller MMN alone is in its corresponding periods.

Should both minor movement controllers be at rest or be in a position of their individual cycle so that both relays GR and G'R' are deenergized then a call on either vehicle detector would be received by the parent controller from ground through detector 401, lines 179, 180, contact 178 of relay GR, line 181, to line 185 which would be part of the internal detector circuit of phase A of the parent controller, or from ground through vehicle detector 401', line 179', line 181' contact 175' of relay G'R' to line 185.

Should both minor movement controllers become actuated so that the relays GR and G'R' both are energized, the vehicle detector circuits would be completed from ground through vehicle detector 401, line 179, 180', contact 176' of relay G'R', line 185 to the parent controller, and from ground through detector 401', line 179', contact 177 of relay GR, lines 181 and 185 to the parent controller.

If the minor movement controller MMS should cause its relay GR to become energized, but controller MMN should cause its relay G'R' to remain deenergized then the detector circuit for the vehicle detector 401' would be completed through contact 177 of relay GR as previously described.

When the relay G'R' becomes energized by controller MMN without the relay GR being energized by controller MMS then the detector circuit of the vehicle detector 401' would be open at contact 175' of relay G'R' while the detector circuit of vehicle detector 401 would be completed through contact 176' of relay G'R' as previously described.

The several figures here presented having been explained, the several modes of operation of traffic control system will now be described.

Assuming a traffic control system of the type illustrated in Fig. 1, the signals 301', 302' and 303' for the east approach westbound traffic on Street B and signals 301, 302 and 303 for the west approach eastbound traffic on Street B would be connected to and controlled as phase B signals by the parent controller. The vehicle detectors 402 and 402' would also be connected to, and send calls to, the parent controller indicating the presence of phase B traffic. The signals 209 for phase A major south and 209' for phase A major north would also be connected to and controlled by the parent controller.

The phase A major south signals 201 and 202 would be controlled by the minor movement controller MMN while the phase A major north signals 201' and 202' would be controlled by the minor movement controller MMS. The vehicle detectors 401 and 401' would be connected to and send calls to the parent controller and indicate the presence of phase A major traffic.

The phase A minor south signals 203, 204 and 205 would be controlled by the minor movement controller MMS and the phase A minor north signals 203', 204' and 205' would be controlled by the minor movement controller, MMN.

The vehicle detector 101 would be connected to the minor movement controller MMS to which calls would be sent indicating the presence of phase A minor south traffic and the vehicle detector 101' would be connected to and send calls, indicating the presence of phase A minor north traffic, to minor movement controller MMN.

The parent controller and the two minor movement controllers would be interconnected, partly in parallel and partly in series, as illustrated in Fig. 2. However, Fig. 2 illustrates three different and separate circuits for the control of the timing in the parent controller and only one method of timing control would be necessary.

For the present purpose let it be assumed that the timing control circuit connected in series from line 219 of the parent controller, through terminal T19, line 219N, to minor movement controller MMN, contact 105' of relay Y'B' or contact 73'/74' of relay G'R', lines 216N, 219S, to minor movement controller MMS. Contact 105 of relay YB or contact 73/74 of relay GR, line 216S to the parent controller, terminal T16 to line 216 of the parent controller is employed to control the parent timing. It will be noticed that either minor movement controller, by opening both of the aforementioned contacts at the same time in the respective controllers, may individually effect an opening of the timing circuit of the parent controller.

As previously mentioned, when the minor movement controllers are at rest the parent controller continues through its cycle without any interruption from either minor movement controller as the above circuit is then complete and is only open when one of the minor movement controllers is in its position 6, 7 or 8.

Let us now assume that both minor movement controllers have been at rest for an appreciable length of time and both vehicle detectors 101 and 101' are actuated in the same part of the same cycle of the parent controller, via the respective traffic movements, phase A minor south and phase A minor north. As previously explained, the minor movement controllers would advance in their respective cycle from the rest position, position 1 and cause calls to be sent to the parent controller in their positions 2 and 3 as previously described. The parent controller would advance from whatever position it is then in, to the beginning of the phase A part of its cycle.

As the parent controller advances from its position 4' to 5' the minor movement controllers would both advance from their position 5 to 6. In position 6 of the minor movement controller, as previously described, the relay GR is energized and relay YB is deenergized. Therefore the alternating current supply circuit for the timing of the parent controller would be open, as seen in Fig. 4 at contacts 105' of relay Y'B' and 73'/74' of relay G'R' of the minor movement controller MMN and at contacts 105 relay YB and 73/74 of relay GR of the minor movement controller MMS. The minor movement controller MMS would cause signals 203, the green signal of phase A minor south, to become illuminated while the red signal 205 of phase A minor south would be extinguished. The signal 202' the red signal of phase A major north would be held illuminated by the minor movement controller MMS while the minor movement controller MMN would cause signal 203' the green signal of phase A minor north to become illuminated. The signal 202, the red signal of phase A major south would remain illuminated via action of minor movement controller MMN. The minor movement controllers MMS and MMN would individually time out the initial interval and the vehicle interval of their respective phase and upon termination of the vehicle interval the green signals 203 and 203' would be extinguished and yellow signal 204 for phase A minor south and yellow signal 204' for phase A minor north would be illuminated during the clearance interval. For purposes of simplicity it is at present assumed that both minor movement controllers have terminated their phases together.

At the termination of the clearance interval the yellow signals 204 and 204' would be extinguished and the red signals 205 and 205' would be illuminated each by the minor movement controller controlling the respective signals.

Control of the intersection would then be relinquished to the parent controller as the timing power circuit would again be completed. The relays YB and Y'B' would be deenergized as previously explained and the relays GR and G'R' would also be deenergized, by the respective minor movement controller, as previously explained so that the parent timing power supply circuit would be completed, as previously described, through contacts 73/74 of relay GR and 73'/74' of relay G'R'.

Both minor movement controllers would advance, independent of each other and independent of the parent controller, to the rest position, position 1.

Let it now be assumed that the minor movement MMS receives a call via actuation of its vehicle detector 101 by phase A minor south traffic, but due to an absence of phase A minor north traffic movement no call is received by the minor movement controller MMN.

The minor movement controller MMN would remain at rest but the minor movement controller MMS would advance through its cycle of operation as previously explained.

As the minor movement controller MMS advances, appropriate calls in positions 2 and 3 would be made to the parent controller since the call circuits in positions 2 and 3 of the minor movement controller, as previously explained, between the parent controller and each minor movement controller are connected in parallel (Fig. 2).

When the parent controller advances into the position 5' and the minor movement controller MMS advances into its position 6, the circuit for the current supply for the parent timing would be broken by open contact 73/74 of relay GR in minor movement controller MMS although contact 73'/74' of relay G'R' would remain closed since minor movement controller MMN would remain at rest.

The signal light 203, the green signal of phase A minor south would be illuminated and the red signal light 202' of phase A major north would remain illuminated, both by the action of the minor movement controller MMS. Since the minor movement controller MMN would be at rest, the green signal of phase A major south 201 would be illuminated and the red signal of phase A minor north remain illuminated. The phase A minor south green and yellow signals would be timed out by the minor movement controller MMS in their order, and upon termination of the phase A minor periods the red signal 205 and the green signal 201' would be illuminated as the green signal 203 and red signal 202' would be extinguished. The relay GR would be deenergized and contact 73/74 would close to complete the power supply circuit for the parent timing.

If, however, the minor movement controller MMN is called via an actuation of its detector 101' and no call is received by the minor movement controller MMS through its vehicle detector 101, the minor movement controller MMS would remain at rest while the minor movement controller MMN would advance out of its rest position. Energization of relay G'R' while relay Y' B' is deenergized would result in an open circuit of the parent timing power supply at open contact 73'/74' in the minor movement controller MMN. The signals 203' and 202 would be illuminated by the active minor movement controller while the signals 203 and 201' would be illuminated through the resting minor movement controller.

At the termination of the phase A minor north, control of the intersection would again be returned to the parent controller. The timing power supply circuit of the parent controller would be completed as contact 73'/74' would close as relay G'R' would become deenergized.

It is obvious that since the minor movement controller is capable of extending the vehicle interval of the phase A minor via actuations during such interval; if both minor movement controllers would be activated at relatively the same time so that each minor movement controller would insert a minor phase into the same cycle of the parent controller as described above, one minor movement controller may, due to lack of or less actuations on its associated vehicle detector during its vehicle interval, terminate its minor phase early with respect to the other minor movement controller, which may receive additional actuations on its vehicle detector during its vehicle interval thus causing its vehicle interval to be extended and effectively increasing the time period of the minor phase of such other minor movement controller.

Assuming such to be the case, it would be seen that initially in phase A minor green signals 203 and 203' would be illuminated by the minor movement controllers while the phase A major red signals 202 and 202' would remain illuminated due to the operations of the minor movement controllers as previously described. Assuming that there is a lack of actuations on the vehicle detector 101' during the vehicle interval of the phase A minor north due to an absence of phase A minor north vehicle traffic multiple actuations on the vehicle detector 101, due to the presence of phase A minor south vehicle detector traffic, during the vehicle interval of the phase A minor south. The phase A minor north green signal would be extinguished via its vehicle interval timer at the end of its unextended vehicle interval and the yellow signal 204' would be illuminated. Since the vehicle interval of the phase A minor south would be extended by actuation of its vehicle detector, as assumed, the green signal 203 and red signal 202' would remain illuminated even through green signal 203' would have been extinguished and the yellow signal 204' would now be illuminated.

At the end of the clearance period of the phase A minor north, the yellow signal 204' would be extinguished and the red signal 205' would be illuminated. As the red signal 205' would be illuminated, indicating the end of the phase A minor north, the red signal 202 of the phase A major south would be extinguished and the green signal 201 would be illuminated. The minor movement controller MMN would then advance to its position 1 independent of minor movement controller MMS, which would remain in its vehicle interval position 7. With the phase A minor south green signal 203 still illuminated, the phase A major north red signal 202' would remain illuminated. The non-opposed phase A major south traffic movements would now proceed, having been given the right of way.

At the later termination of the vehicle interval of phase A minor south via the maximum interval timer as otherwise assumed the green signal 203 would be extinguished and the yellow signal 204 would be illuminated.

With the termination of the clearance interval of the phase A minor south the yellow signal 204 and the red signal 202' would both be extinguished and the red signal 205 of phase A minor south and the green signal 201' of phase A major north would both be illuminated. The minor movement controller MMS would then advance to its position 1 without interference with the minor movement controller MMN or the parent controller.

It was previously pointed out that the parent timing power circuit could be broken independently by each minor movement controller and when, as previously described the minor movement controller MMN would terminate its phase A minor north early, with respect to the minor movement controller MMS, the contact 73'/74' of relay G'R' would have closed with such termination. However, since the minor movement controller MMS would still be in its position 7, its relay GR would still be energized and contact 73/74 would still be open to keep the circuit for the power supply to the parent timing open. Thus the parent timing power circuit would become complete only upon the termination of the last terminating phase A minor, in this case phase A minor south.

Such operation of one minor movement controller extending its vehicle interval beyond that of the other minor movement controller may be reversed; thus early termination of a phase A minor south would accord right of way to phase A major north traffic during that part of the phase A minor north period that is still in effect after the termination of the phase A minor south period, and it is believed that this operation will be obvious in view of the above description and by reference to Fig. 7.

Heretofore it has been assumed that the control of the parent timing was of the type illustrated in Fig. 3. Should the alternate method of timing control of the parent timing, as illustrated in Fig. 3*a*, be employed, the control circuits, as illustrated in Fig. 2 would be parallel circuits from the parent controller and into each minor movement controller so that the relay TR (Fig. 3*a*), could be energized by the action of each minor movement controller independent of the other.

In order that the energizing circuit for relay TR be completed, the combination of relay YB deenergized and relay GR energized must be obtained.

When the cycle of the minor movement controller MMS the relay YB is deenergized and relay GR is energized, a circuit could be completed from line 219 of the parent controller through terminal T19, line 219N contact 73'/74' of relay G'R' of the minor movement controller MMN, line 216N, line 219S, contact 74/75 of relay GR of minor movement controller MMS contact 106 of relay YB of minor movement controller MMS, lines 217S, 217P, terminal T17 to line 217 to the parent controller, to energize the relay TR so that the contact TR1, of Fig. 3*a*, would become open to interrupt the timing power supply of the parent controller.

When the relay G'R' becomes energized and relay Y'B' becomes energized the circuit to energize relay TR would be completed from line 219 of the parent controller through terminal T19, line 219N, contact 74'/75' of relay G'R', contact 106' of relay Y'B', lines 217N, 217P, terminal T17 to line 217 to relay TR to ground.

It should be noted that the energizing circuit for relay TR, when energized via the minor movement controller MMS, must pass through certain contacts in minor movement controller MMN so that should both minor movement controllers be actuated, the minor movement controller MMN would complete the energizing circuit for relay TR. However, if minor movement controller MMN should terminate its minor phase before minor movement controller MMS, then minor movement controller MMS would hold relay TR energized when minor movement controller MMN would terminate its minor phase early with respect to the minor phase of MMS through the energizing circuit previously described for minor movement controller MMS.

A third method of control of the parent controller may be empolyed. The "yield control," as previously described, would control the parent controller through the use of a series circuit as shown in Fig. 2, which would apply a ground connection to line 218 of the parent controller through terminal T18, line 218S, contact 170 of relay YC, when closed lines 218GS, 218N, contact 170' of relay Y'C' when closed line 218GN to common ground. Each minor movement controller could effectively open the ground circuit thus preventing the parent controller from advancing in its cycle, as previously explained by causing its respective relay YC or Y'C' to become deenergized and release its contact 170 or 170' respectively.

It should be understood that the present disclosure represents one embodiment of the invention, this and other rearrangements of the parts or changes in the details of the parts may be made without departing from the spirit of the invention as defined by the claims.

I claim:

1. In a traffic control system for more than two interfering traffic lanes having signals for accord and interruption of right of way to the respective lanes and for clearance of traffic in the respective lanes following accord of right of way, a parent controller for normal cyclic accord of right of way in the lanes in succession, traffic actuated means in a first lane and a second lane of said lanes, said first and second lanes being interfering with respect to certain of the remaining lanes but not with each other, minor movement controllers individual to said first and second lanes to interrupt said normal cyclic accord of right of way by said parent controller to said certain lanes at a particular part in the cycle of said parent controller and to accord right of way to said first and second lanes concurrently in response to traffic actuation of the traffic actuated means in both said first and second lanes and to provide a following clearance period in the respective first and second lanes and then to return the parent controller to normal cyclic control with accord of right of way to said certain lanes, said minor movement controllers including means for operating each minor movement controller independently of the other and so interrupting the normal accord of right of way by the parent controller and so according right of way to its associated one of the first and second traffic lanes at said particular part of the cycle of the parent controller, whereby each said minor movement controller will interrupt only the one of said certain traffic lanes interfering with the one of said first and second lanes associated with said particular minor movement controller and return control of said one of certain lanes to the parent controller upon completion of said control of right of way and clearance by the minor movement controller.

2. In a traffic control system for more than two interfering lanes, having signals for accord and interruption of right of way to the respective lanes and for clearance of traffic in the respective lanes following accord of right of way, traffic actuated means in a first lane and a second lane of said lanes, which first and second lanes interfere with the remaining of said lanes except different ones of certain of said lanes but are not interfering with respect to each other, a parent controller for cyclic accord of right of way in said certain of said lanes and others of the lanes in succession, except said first and second of said lanes, minor movement controllers associated with said first and second lanes respectively and each operated individually in response to actuation of its associated traffic actuated means to interrupt said normal cyclic accord of right of way by said parent controller to one of said certain lanes interfering with its associated one of said first and second lanes and to accord right of way to its associated said one of its first and second lanes at a particular part of the cycle of said parent controller in which the latter normally accords the right of way to said certain lanes, each said minor movement controller including means for returning control of the one of said certain lanes which interferes with its associated one of said first and second lanes to said parent controller upon completion of said accord of right of way and the following clearance period by said minor movement controller, and said minor movement controllers each including means for holding said parent controller in said particular part of its cycle until both of said minor movement controllers have completed such accord of right of way and following clearance period when so actuated by their respective traffic actuated means.

3. A system as in claim 2 in which said parent controller is of the traffic actuated type and each minor movement controller includes means to call the parent controller to the said particular part of its cycle when the parent controller is in another part of its cycle and to call the parent controller away from said particular part of its cycle and back to said particular part of the cycle when said parent controller is already in said particular part of its cycle.

4. A system as in claim 3 and which includes means for timing said minor movement right of way to be extendible between minimum and maximum limits by actuation of the associated traffic actuated means for the respective controllers, and means operated by said maximum means to call the parent controller again to said particular part of its cycle and to call said minor movement controller again to so provide the minor movement right of way without further traffic actuation.

5. A system as in claim 2 and in which each minor movement controller includes means for so holding the parent controller in said particular part of its cycle by stopping the timing of said parent controller.

6. A traffic control system as in claim 2 and in which each minor movement controller includes means cooperating with the other controller for individually so holding the parent controller at its particular part of its cycle by preventing the parent controller from leaving said particular part of its cycle while permitting the parent controller to complete its timing in said particular part of its cycle, and so holding said parent controller until completion of a time period controlled by the individual minor movement controller after its completion of its associated right of way according and clearance periods.

7. In a traffic control system for more than two interfering lanes having signals for accord and interruption of right of way in the respective lanes and for clearance of traffic in the respective lanes following accord of right of way, a parent controller for normal cyclic accord of right of way in the lanes in succession except a first and second of said lanes which interfere with certain of the other lanes but are non-interfering with respect to each other, traffic actuated means in said first and second of said lanes, minor movement controllers individual to said first and second lanes for individually interrupting said normal cyclic accord of right of way by said parent controller to said certain lanes at a particular part of the cycle of said parent controller and to accord right of way to its associated one of said first and second lanes for a time period extendible between minimum and maximum limits by actuation of its respective associated traffic actuated means in its associated one of said first and seconds lanes and to provide a following clearance period to its associated one of said first and second lanes and then to return to the parent controller the control of accord of right of way to the one of said certain lanes with which its associated one of first and second lanes is interfering, and said minor movement controllers each including means cooperating with the other minor movement controller to return the parent controller to normal cyclic control of accord of right of way to said certain lanes while interrupting right of way in both first and second lanes upon completion of the accord of right of way and following clearance periods for whichever of said minor movement controllers have so completed their respective such periods.

8. A system as in claim 2 in which traffic actuated means are provided for some of said remaining lanes and said parent controller includes means for cyclically according right of way in response to actuation of said last named traffic actuated means.

9. A system as in claim 2, in which traffic actuated means are included for all of the several lanes controlled by said parent controller and said parent controller includes means for so cyclically according right of way in response to the respective last named traffic actuated means.

10. In a traffic control system for two intersecting roads and including a left turn lane in each approach of at least one of said roads and having stop and go signals for the intersecting roads and for the left turn lanes, traffic detectors for actuation by traffic approaching in the respective left turn lanes, a primary controller for operating the signals to accord right of way alternatively to the two roads except for said left turn lanes between minimum and maximum time limits responsive to actuation of the respective detectors in the respective roads except the left turn lanes, a secondary controller for each of said left turn lanes and connected to the detector of its associated lane to be operated in response to actuation of its associated detector for interrupting the normal operation of the signals by a said primary controller at a particular part of the cycle of operation of the latter, this being the same part for each of said secondary controllers, for temporarily superseding the control of the primary controller over the said go signals and stop signals and for causing operation by said secondary controller of the go signal for its associated left turn lane and for preventing the normal operation of the go signals for the opposing straight through lane on the opposite approach of the intersection and causing operation of the stop signal in the latter lane, and means in the respective secondary controllers for preventing said primary controller from proceeding beyond said particular part of its cycle while either of said secondary controllers is so operating the go signal for its associated left turn lane and until such secondary controllers have proceeded through their respective cycles to terminate their respective go signals and operate their respective red signals in their respective left turn lanes.

11. A system as in claim 10 and which includes clearance signals for the intersecting roads and left turn lanes and in which said secondary controllers so supersede the operation of the primary controller and prevent it from leaving said particular part of its cycle until after the respective secondary controllers have completed periods of operation of the go signals and following clearance signals for the respective left turn lanes.

12. A system as in claim 10 in which said primary controller includes means for extending the respective go signal periods of said respective straight through lanes in accordance with actuations of the respective traffic detectors therein, and means in said respective secondary controllers for preventing said extension of the said respective last named go signal periods by the detectors in the respective associated lanes receiving a go signal only when the go signal is accorded to either one alone of said straight through lanes while the other of said straight through lanes is receiving a stop signal in connection with operation of one alone of said left turn go signals by the associated one alone of said secondary controllers.

13. A traffic control system for two intersecting roads each having a left turn lane in each approach of at least one of said roads and a straight through lane adjacent to each left through lane, such that traffic left turn movements from said two approaches interfere with the straight through movement from the opposite approach but do not interfere with each other, stop signals, and go signals and clearance signals for the respective roads and including such signals for the respective lanes, traffic actuated means in the respective left turn lanes and in at least some of the remaining lanes of the roads, a primary controller for normally operating said signals for according right of way alternatively to said straight through lanes together on said one road and to both approaches together of the road in a cycle of operation in response to actuation of said traffic actuated means in said some of said remaining lanes, two secondary controllers including one for each of said left turn lanes for normally operating the stop signals in their respective left turn lanes during said normal cycle of operation of said primary controller and each for operating in response to actuation of the traffic actuated means in its associated left turn lane for superseding temporarily such normal operation of said primary controller at the part of the cycle of the latter normally operating go signals of said straight through lanes and for operating the go signal followed by the clearance signal for the respective associated left turn lanes while interrupting the stop signals in the respective left turn lanes and operating the stop signals in the straight through lanes opposing the respective left turn lanes, said secondary controllers so superseding the operation of said primary controller only with respect to the operation of the signals for the respective straight through lanes and said secondary controllers so operating to so accord right of way concurrently in response to actuation of both said traffic actuated means in both said left turn lanes and to so accord right of way individually to the actuated one of said left turn lanes while interrupting right of way to the other of said left turn lanes and permitting accord of right of way to the straight through lane opposing said other left turn lane in response to actuation of the traffic actuated means on said one of said left turn lanes.

No references cited.